US012606475B2

(12) United States Patent
Iiyama et al.

(10) Patent No.: US 12,606,475 B2
(45) Date of Patent: Apr. 21, 2026

(54) PRODUCTION METHOD AND PRODUCTION DEVICE FOR WATER FOR PURE WATER, AND PRODUCTION METHOD AND PRODUCTION SYSTEM FOR PURE WATER

(71) Applicant: Nomura Micro Science Co., Ltd., Atsugi (JP)

(72) Inventors: Masamitsu Iiyama, Atsugi (JP); Hiroki Miyazawa, Atsugi (JP); Yoshihiro Akimoto, Atsugi (JP)

(73) Assignee: Nomura Micro Science Co., Ltd., Atsugi (JP)

( * ) Notice: Subject to any disclaimer, the term of this patent is extended or adjusted under 35 U.S.C. 154(b) by 0 days.

(21) Appl. No.: 18/820,577

(22) Filed: Aug. 30, 2024

(65) Prior Publication Data

US 2025/0091925 A1      Mar. 20, 2025

(30) Foreign Application Priority Data

Sep. 14, 2023    (JP) ................................. 2023-149282

(51) Int. Cl.
*C02F 9/00*          (2023.01)
*B01D 15/36*         (2006.01)
(Continued)

(52) U.S. Cl.
CPC .............. *C02F 9/00* (2013.01); *B01D 15/361* (2013.01); *B01D 61/146* (2022.08); *B01D 61/16* (2013.01);
(Continued)

(58) Field of Classification Search
CPC .... C02F 9/00; C02F 1/325; C02F 1/42; C02F 1/444; C02F 1/5245; C02F 1/72; C02F 2001/007; C02F 2103/04; C02F 2103/346; C02F 2301/043; C02F 2301/046; C02F 2301/08; C02F 2301/16; B01D 61/146;
(Continued)

(56) References Cited

U.S. PATENT DOCUMENTS 6,464,877 B1 * 10/2002  Mori ......................... C02F 1/52
                                                        210/639
2023/0050962 A1 *  2/2023  Staaks .................... B01D 65/08

FOREIGN PATENT DOCUMENTS

CN          211921175 U       11/2020
JP          H04290591 A       10/1992
(Continued)

OTHER PUBLICATIONS

Office Action issued on Nov. 19, 2024, in corresponding Japanese Application No. 2023-149282, 9 pages.
(Continued)

*Primary Examiner* — In Suk C Bullock
(74) *Attorney, Agent, or Firm* — Maier & Maier, PLLC

(57)          ABSTRACT

A production method for water for pure water includes adding polyaluminum chloride to raw water to produce first treated water, and filtering the first treated water in two or more stages including filtering with a filtration membrane device in a preceding stage to produce first concentrated water, and filtering the first concentrated water with a filtration membrane device in a subsequent stage. The water for pure water is produced as permeated water produced by the filtering in the two or more stages.

8 Claims, 8 Drawing Sheets

(51) Int. Cl.

| | |
|---|---|
| *B01D 61/14* | (2006.01) |
| *B01D 61/16* | (2006.01) |
| *B01D 61/18* | (2006.01) |
| *B01D 65/02* | (2006.01) |
| *C02F 1/00* | (2023.01) |
| *C02F 1/32* | (2023.01) |
| *C02F 1/42* | (2023.01) |
| *C02F 1/44* | (2023.01) |
| *C02F 1/52* | (2023.01) |
| *C02F 1/72* | (2023.01) |
| *C02F 103/04* | (2006.01) |
| *C02F 103/34* | (2006.01) |

(52) U.S. Cl.
CPC ............. *B01D 61/18* (2013.01); *B01D 65/02* (2013.01); *B01D 2311/04* (2013.01); *B01D 2311/06* (2013.01); *B01D 2315/08* (2013.01); *B01D 2317/022* (2013.01); *B01D 2317/025* (2013.01); *B01D 2317/06* (2013.01); *C02F 2001/007* (2013.01); *C02F 1/325* (2013.01); *C02F 1/42* (2013.01); *C02F 1/444* (2013.01); *C02F 1/5245* (2013.01); *C02F 1/72* (2013.01); *C02F 2103/04* (2013.01); *C02F 2103/346* (2013.01); *C02F 2301/043* (2013.01); *C02F 2301/046* (2013.01); *C02F 2301/08* (2013.01); *C02F 2303/16* (2013.01)

(58) Field of Classification Search
CPC ...... B01D 15/361; B01D 61/16; B01D 61/18; B01D 65/02; B01D 2311/04; B01D 2311/06; B01D 2315/08; B01D 2317/022; B01D 2317/025; B01D 2317/06
USPC .......................................................... 210/638
See application file for complete search history.

(56) References Cited

FOREIGN PATENT DOCUMENTS

| | | | |
|---|---|---|---|
| JP | H0985262 | A | 3/1997 |
| JP | 2003300069 | A | 10/2003 |
| JP | 2005224761 | A | 8/2005 |
| JP | 2005-246157 | A | 9/2005 |
| JP | 2006187719 | A | 7/2006 |
| JP | 2008-86966 | A | 4/2008 |
| JP | 201286149 | A | 5/2012 |
| JP | 2012086149 | A | 5/2012 |
| JP | 2012120943 | A | 6/2012 |
| JP | 2013220396 | A | 10/2013 |
| JP | 2014-168729 | A | 9/2014 |
| JP | 2018144033 | A | 9/2018 |
| JP | 2019130501 | A | 8/2019 |
| JP | 2019205994 | A | 12/2019 |
| JP | 2022108707 | A | 7/2022 |
| JP | 2022-165279 | A | 10/2022 |
| JP | 2022152649 | A | 10/2022 |
| WO | 2015075302 | A1 | 5/2015 |

OTHER PUBLICATIONS

Decision to Grant a Patent issued on Mar. 18, 2025, in corresponding Japanese Application No. 2023-149282; 6 pages.
Office Action issued on Sep. 10, 2025, in corresponding Korean Application No. 10-2024-0116733, 27 pages.
Office Action issued on Jul. 4, 2025, in corresponding Chinese Application No. 202411207740.2, 18 pages.
Office Action issued on Aug. 16, 2025, in corresponding Chinese Application No. 202411207740.2, 15 pages.
"Water Purification System", Testing of Experiments in Molecular Biology, Ed., Central Man University Press, 1st Edition, Mar. 2008, 8 pages.
Office Action issued on Oct. 26, 2025, in corresponding Chinese Application No. 202411207740.2, 17 pages.
Office Action issued on Jan. 16, 2026, in corresponding Chinese Application No. 202411207740.2, 12 pages.

* cited by examiner

PRODUCTION METHOD AND PRODUCTION DEVICE FOR WATER FOR PURE WATER, AND PRODUCTION METHOD AND PRODUCTION SYSTEM FOR PURE WATER

TECHNICAL FIELD

The present invention relates to a production method and a production device for water for pure water, and a production method and a production system for pure water.

BACKGROUND

For water treatment processes such as the production of industrial water from river water, well water, lake water, and the like, and wastewater treatment, clarification techniques such as a sand filtration method and a flocculation and precipitation method have been employed. However, the sand filtration method and the flocculation and precipitation method by slow filtration are problematic in that these methods require a large equipment area for equipment, strict operation control depending on the water to be treated, and the like. To overcome the shortcomings of such methods, membrane separation methods using filtration membranes such as microfiltration membranes (MF) or ultrafiltration membranes (UF) have been widely adopted. In such membrane separation methods, in order to enhance a clarification efficiency, an inorganic flocculant such as polyaluminum chloride (PAC) is added to the water to be treated prior to membrane separation to cause a flocculation reaction and generate flocculated floc, and the flocculated water containing the flocculated floc is filtered through a filtration membrane (refer to, for example, Patent Documents 1, 2).

In the method in which the flocculated water is separated by filtration through a filtration membrane, there is a problem in that fouling of the filtration membrane occurs due to the addition of the inorganic flocculant. To suppress this, a method in which an organic anionic substance is added to the water to be treated has also been proposed (refer to Patent Document 3, for example).

In the production of pure water or ultrapure water for the semiconductor electronic industry or pharmaceutical industry, typically tap water, industrial water, or the like is used as raw water, and the raw water is passed through a membrane treatment device such as a reverse osmosis membrane device (RO) or an ultrafiltration membrane device (UF), and then treated in combination with an ion exchange resin device, an ultraviolet irradiation device, or the like. When tap water, industrial water, or the like is used as raw water, the raw water is treated with PAC and then supplied to a treatment device in a subsequent stage in order to remove suspended solids in the raw water. However, since residual aluminum derived from the PAC is included, a method of removing the residual aluminum by using an iron-based inorganic polymer flocculant is also known. This is because residual aluminum in the raw water adheres to a membrane of the reverse osmosis membrane device or the like, thereby significantly reducing a permeation flux of the membrane treatment device (refer to Patent Document 4, for example).

PATENT LITERATURE

Patent Document 1: JP 2014-168729 A
Patent Document 2: JP 2005-246157 A
Patent Document 3: JP 2022-165279 A
Patent Document 4: JP 2008-86966 A

SUMMARY

However, the method of filtering the flocculated water described above has a problem in that a water recovery rate is low relative to a scale of the device. Accordingly, the method of filtering the flocculated water in the related art is not suitable for the semiconductor electronic industry or the pharmaceutical industry in which a large amount of pure water or ultrapure water is produced. Further, the use of PAC in the production of pure water or ultrapure water for the semiconductor electronic industry or the pharmaceutical industry has a problem in that fouling or membrane clogging occurs due to adhesion of residual aluminum present in the water onto the membrane. However, in the method using an organic anionic substance or an iron-based inorganic polymer flocculant, there are problems such as an increase in cost and environmental load due to an increase in the amount of the chemicals used. Further, there is also a problem of membrane clogging caused by adsorption of the residue of the polymer flocculant on a membrane surface of the membrane treatment device in the subsequent stage.

The present invention has been made to solve the problems described above, and an object thereof is to provide a production method and a production device for water for pure water capable of efficiently removing suspended solids and the like in raw water, markedly improving a water recovery rate, and suppressing clogging of a filtration membrane device over a long period of time.

Further, another object of the present invention is to provide a production method and a production system for pure water capable of producing high-quality pure water over a long period of time by efficiently removing suspended solids in raw water, markedly improving a water recovery rate, and suppressing clogging of a filtration membrane device over a long period of time.

A production method, a production device, and a pure water production system according to embodiments of the present invention are as follows.

[1] A production method for water for pure water includes adding polyaluminum chloride to raw water to produce first treated water, and filtering the first treated water in two or more stages including filtering the first treated water with a filtration membrane device in a preceding stage to produce first concentrated water, and filtering the first concentrated water with a filtration membrane device in a subsequent stage. The water for pure water is produced as permeated water produced by the filtering in the two or more stages.

[2] In the production method according to [1], adding polyaluminum chloride having high basicity to the raw water to produce the first treated water including microfloc.

[3] In the production method according to [1] or [2], the polyaluminum chloride has a basicity greater than 75%.

[4] In the production method according to any one of [1] to [3], the polyaluminum chloride includes aluminum chloride pentahydroxide, and the aluminum chloride pentahydroxide is added in an amount of 0.25 mg/L or greater and 25 mg/L or less with respect to the raw water in terms of aluminum oxide ($Al_2O_3$) concentration.

[5] The production method according to [1] further includes adjusting a pH of the raw water doped with the polyaluminum chloride, and the polyaluminum chloride has a basicity of 75% or less.

[6] The production method according to any one of [1] to [5] further includes at least one process of adding polyaluminum chloride to concentrated water produced by, among the filtration membrane devices in the two or more stages, at least the filtration membrane device in one stage, and then supplying the concentrated water to the filtration membrane device in the subsequent stage.

[7] The production method according to any one of [1] to [6] further includes adding polyaluminum chloride to concentrated water produced by, among the filtration membrane devices in the two or more stages, at least the filtration membrane device in a final stage to produce second treated water, and dead-end filtering the second treated water by the filtration membrane device. Permeated water produced by the dead-end filtering is used as the raw water.

[8] The production method according to [7] further includes cleaning the filtration membrane device that performed the dead-end filtering, and separating a supernatant from wash water generated in the cleaning. The supernatant is used as the raw water.

[9] A production method for pure water includes, in order, producing water for pure water by adding polyaluminum chloride to raw water to produce first treated water, and filtering the first treated water in two or more stages including filtering with a filtration membrane device in a preceding stage to produce first concentrated water, and filtering the first concentrated water with a filtration membrane device in a subsequent stage, to produce the water for pure water as permeated water produced by the filtering in the two or more stages, and performing ultraviolet oxidation and ion exchange.

[10] A production device for producing water for pure water includes a raw water supply device configured to supply raw water, a polyaluminum chloride supply device configured to add polyaluminum chloride to the raw water, filtration membrane devices in two or more stages configured to filter first treated water generated by adding the polyaluminum chloride to the raw water, a concentrated water pipe configured to supply concentrated water produced by, among the filtration membrane devices in the two or more stages, a filtration membrane device in a preceding stage to a filtration membrane device in a subsequent stage, and a plurality of transfer pipes configured to transfer permeated water produced by the filtration membrane devices in the two or more stages to produce water for pure water.

[11] In the production device, the polyaluminum chloride has a basicity greater than 75%.

[12] In the production device, the polyaluminum chloride includes aluminum chloride pentahydroxide, and the polyaluminum chloride supply device is configured to supply aluminum chloride pentahydroxide in an amount of 0.25 mg/L or greater and 25 mg/L or less with respect to the raw water in terms of aluminum oxide ($Al_2O_3$) concentration.

[13] The production device according to [10] further includes a pH adjustment device configured to adjust a pH of the raw water doped with the polyaluminum chloride. The polyaluminum chloride has a basicity of 75% or less.

[14] The production device according to any one of [10] to [13] further includes one or more polyaluminum chloride supply devices configured to add the polyaluminum chloride to concentrated water produced by, among the filtration membrane devices in two or more stages, at least the filtration membrane device in one stage. The filtration membrane device in the subsequent stage is configured to filter the concentrated water doped with the polyaluminum chloride.

[15] The production device according to any one of [10] to [14] further includes a polyaluminum chloride supply device configured to add polyaluminum chloride to concentrated water produced by at least, among the filtration membrane devices in the two or more stages, a filtration membrane device in a final stage, a filtration membrane device configured to dead-end filter second treated water generated by adding the polyaluminum chloride to the concentrated water produced by the filtration membrane device in the final stage, and a pipe configured to feed permeated water produced by the filtration membrane device configured to perform the dead-end filtering to the raw water supply device for use as the raw water.

[16] The production device according to [15] further includes a cleaning device configured to clean the filtration membrane device configured to perform the dead-end filtration, a sedimentation concentration device configured to separate a supernatant from wash water generated in the cleaning device, and a pipe for feeding the supernatant to the raw water supply device.

[17] A production system for pure water includes, in order, the production device for water for pure water according to [10] or [15], an ultraviolet oxidation device, and an ion exchange device.

Note that a numerical range including the term "to" indicates a numerical range including the numerical values before and after the term "to".

According to a production method and a production device for water for pure water according to the present invention, it is possible to efficiently remove suspended solids in raw water, markedly improve a water recovery rate, and suppress clogging of a filtration membrane device over a long period of time.

Further, according to a production method and a production system for pure water according to the present invention, it is possible to produce high-quality pure water over a long period of time by efficiently removing suspended solids in raw water, markedly improving a water recovery rate, and suppressing clogging of a filtration membrane device over a long period of time.

DETAILED DESCRIPTION

Figure 1:
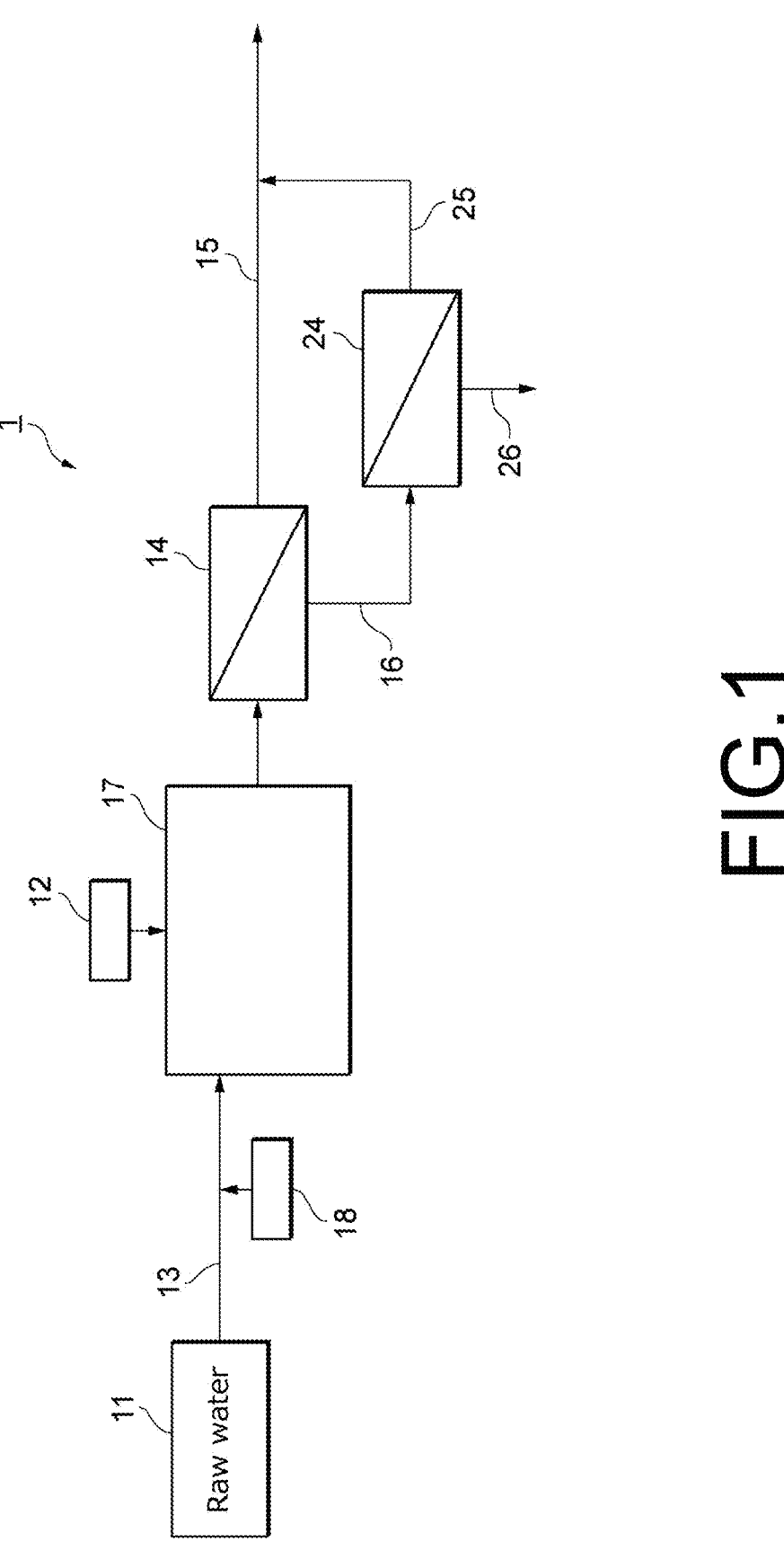
FIG. 1 is a view schematically illustrating a production device used in a production method for water for pure water according to an embodiment.

Hereinafter, embodiments of the present invention will be described. FIG. 1 schematically illustrates a production device 1 used in a production method for water for pure water according to a first embodiment. The production device 1 includes a raw water supply device 11 that supplies raw water, a polyaluminum chloride supply device 12 that supplies polyaluminum chloride (hereinafter also referred to as "PAC"), and a raw water transfer pipe 13 that transfers the raw water. The production device 1 further includes a first ultrafiltration membrane device 14 as a filtration membrane device in a preceding stage that filters raw water (first treated water) doped with PAC. The first ultrafiltration membrane device 14 includes a transfer pipe 15 that transfers permeated water thereof to a subsequent stage, and a concentrated water pipe 16 that discharges concentrated water thereof.

The production device 1 further includes a second ultrafiltration membrane device 24 as a filtration membrane device in a subsequent stage that is connected to the concentrated water pipe 16 of the first ultrafiltration membrane device 14 and filters the concentrated water produced by the first ultrafiltration membrane device 14. The second ultrafiltration membrane device 24 includes a transfer pipe 25 that transfers permeated water thereof to a subsequent stage, and a concentrated water pipe 26 that discharges concentrated water thereof.

The production device 1 further includes a reaction tank 17 that accommodates raw water supplied from the raw water supply device 11, and a pH adjustment device 18 that adds a pH adjusting agent to the raw water. This reaction tank 17 may be a mixing tank in which PAC is mixed with the raw water to form microfloc (microfloc method), or may be a settling tank for rapid filtration, but is preferably a mixing tank. The polyaluminum chloride supply device 12 is connected to the reaction tank 17. The reaction tank 17 is provided upstream of the first ultrafiltration membrane device 14 in a path of the raw water transfer pipe 13. The pH adjustment device 18 is provided upstream of the reaction tank 17 in the path of the raw water transfer pipe 13. That is, the pH adjustment device 18, the reaction tank 17, and the first ultrafiltration membrane device 14 are disposed in this order in the path of the raw water transfer pipe 13. Note that the reaction tank 17 and the pH adjustment device 18 are not essential, and need only be provided as necessary.

In the production device 1, two ultrafiltration membrane devices, that is, the first ultrafiltration membrane device 14 and the second ultrafiltration membrane device 24, are connected in series (two stages) and each performs filtration in a cross-flow system. Then, the concentrated water produced by the ultrafiltration membrane device in the preceding stage is filtered by the ultrafiltration membrane device in the subsequent stage, and the permeated water of the ultrafiltration membrane device in the preceding stage and the permeated water produced by the ultrafiltration membrane device in the subsequent stage are collected as water for pure water. In this way, a connection mode in which a treated liquid obtained from a secondary side (discharge side) of a device of a preceding stage is treated in a device in a subsequent stage is referred to as "serial", and is distinguished from a "parallel" connection in which the water to be treated is branched, supplied to, and treated in a plurality of devices. That is, in the present embodiment, the concentrated water (first concentrated water) of the first ultrafiltration membrane device 14 is filtered by the second ultrafiltration membrane device 24, and the permeated water (first permeated water) of the first ultrafiltration membrane device 14 and the permeated water (second permeated water) of the second ultrafiltration membrane device 24 are collected as water for pure water. The concentrated water (second concentrated water) of the second ultrafiltration membrane device 24 may be discharged outside of the system, or may be subjected to additional treatment and returned to the preceding stage. In the present embodiment, a mode in which the ultrafiltration membrane devices in two stages are provided will be described, but a similar configuration in which the ultrafiltration membrane devices in three or more stages are provided may be adopted.

Here, "two or more stages" in the present embodiment means arrangement in multiple stages. "Two or more stages" specifically refers to a mode in which two or more filtration membrane devices are connected in series and each filtration membrane device filters the concentrated water in the preceding stage, and refers to a first stage, a second stage, and the like from the start of the serial connection (the same applies hereinafter). Further, the method is not limited to one in which each of the filtration membrane devices provided in multiple stages filters the concentrated water produced by the filtration membrane device in the immediately preceding stage, but also includes a case in which filtration is performed on the concentrated water produced by any desired filtration membrane device in a preceding stage. Further, in the present embodiment, an example will be described in which the system includes a polyaluminum chloride supply device 12 that adds PAC to the raw water, but one or more polyaluminum chloride supply devices that respectively add PAC to water supplied to the filtration membrane devices in the second and subsequent stages may be provided. In this case, the one or more polyaluminum chloride supply devices may add PAC to all of the water supplied to the filtration membrane devices in the second and subsequent stages, or may add PAC to the water supplied to some of the filtration membrane devices. The addition of PAC is preferably carried out upstream of the filtration membrane device in the most preceding stage.

A production method for water for pure water according to an embodiment that uses the production device 1 is as follows. First, raw water is supplied from the raw water supply device 11 into the raw water transfer pipe 13. The raw water is urban water such as city water or industrial water, or is natural water such as river water, lake water, ground water, or well water. The raw water has, for example, a turbidity of from 1 NTU to 100 NTU, suspended solids (SS) of from 5 mg/L to 500 mg/L, a total organic carbon (TOC) concentration of from 0.5 mg/L to 7 mg/L, an aluminum concentration of from 0.01 mg/L to 5 mg/L, and a pH of 4 to 9. In some cases, free chlorine may be added to the raw water during transfer by the raw water transfer pipe 13 or the like. The raw water supply device 11 includes, for example, a raw water tank that stores raw water and a water supply pump that transfers the raw water in the raw water tank, and the water supply pump supplies the raw water in the raw water tank into the raw water transfer pipe 13. Note that, depending on the quality of the raw water, a prefilter (not illustrated) may be attached as a pretreatment device to pre-treat the raw water before the addition of PAC. Further, when urea or a low molecular organic substance is mixed in the raw water, a chemical oxidation treatment or an accelerated oxidation treatment using ultraviolet rays may be performed.

In the production device 1, raw water from the raw water supply device 11 and PAC from the polyaluminum chloride supply device 12 are each supplied into the reaction tank 17. In the reaction tank 17, the suspended solids in the raw water and the PAC interact with each other, forming floc, microfloc, nanofloc, and the like. In this case, the raw water and the PAC may be supplied to the reaction tank 17 in any order or simultaneously, but preferably the PAC is added to the reaction tank 17 supplied with the raw water.

In a case in which the production device 1 does not include the reaction tank 17, the polyaluminum chloride supply device 12 is connected to the raw water transfer pipe 13 and adds PAC into the raw water transfer pipe 13. As a result, the first treated water is generated. In a case in which the reaction tank 17 is not used, the production device 1 can be reduced in size, facilitating installation in a semiconductor manufacturing plant or the like. Note that, by installing an in-line mixer or the like for promoting mixture of the raw water and the PAC in the raw water transfer pipe 13 after the supply of the PAC, it is possible to further suppress clogging of equipment in a subsequent stage.

The polyaluminum chloride supply device 12 includes, for example, a chemical solution tank that stores PAC and a chemical injection pump that adds the PAC in the chemical solution tank into the reaction tank 17. The chemical injection pump measures the PAC in the chemical solution tank and adds PAC into the reaction tank 17 so as to have a predetermined concentration.

At this time, according to the basicity of the PAC, the pH adjustment device 18 adds an acid and an alkali, which are pH adjusting agents, to the raw water to adjust the pH of the raw water. Either one or both of the acid and the alkali may be added. Specifically, when PAC having low basicity described below is used, the pH adjustment device 18 adds a pH adjusting agent to the reaction tank 17 to adjust the pH of the raw water before the PAC is added. The pH adjustment device 18 includes, for example, an acid storage tank that stores the acid and an acid injection pump that adds the acid in the acid storage tank to the reaction tank 17. The pH adjustment device 18 includes an alkali storage tank that stores the alkali and an alkali injection pump that adds the alkali in the alkali storage tank to the reaction tank 17. Then, the acid injection pump and the alkali injection pump measure and add the acid in the acid storage tank and the alkali in the alkali storage tank to the reaction tank 17 so that the raw water has a predetermined pH. The acid used here is typically sulfuric acid and the alkali is typically sodium hydroxide (aqueous solution). Note that, when the production device 1 does not include the reaction tank 17, the pH adjustment device 18 is connected to the raw water transfer pipe 13 and adds the pH adjusting agent into the raw water transfer pipe 13.

The PAC in the present embodiment includes polyaluminum chloride represented by the following chemical formula (1).

$$[Al_2(OH)_nCl_{6-n}]_m (1 \leq n \leq 5, m \leq 10) \qquad (1)$$

As the PAC of the present embodiment, either low basicity PAC or high basicity PAC can be used. As the PAC of the present embodiment, one of low basicity PAC and high basicity PAC is preferably used. When PAC having low basicity (hereinafter referred to as "low basicity PAC") is used, preferably the pH of the raw water is adjusted by providing the pH adjustment device described above. Basicity is a value calculated by $n/6 \times 100(\%)$ in the above chemical formula (1).

The low basicity PAC preferably has a basicity of 75% or less, more preferably 60% or greater and 70% or less. The low basicity PAC can be produced by a method described in, for example, JP 2009-203125 A. As the low basicity PAC, one type may be used, or two or more types may be used in combination. When two or more types are used in combination, the basicities of the two or more types of low basicity PACs may be the same or different, but the basicity of each low basicity PAC used is preferably 75% or less, more preferably 60% or greater and 70% or less.

The amount of the low basicity PAC is preferably 0.03 mg/L as $Al_2O_3$ or greater with respect to a turbidity of 1 NTU in the raw water. Typically, the added amount of PAC is determined by the quality of the water to be treated, and an optimum added amount of PAC can be determined by a jar test. Specifically, the amount of the low basicity PAC is preferably 0.05 mg/L as $Al_2O_3$ or greater and 25 mg/L as $Al_2O_3$ or less, more preferably 0.1 mg/L as $Al_2O_3$ or greater and 20 mg/L as $Al_2O_3$ or less relative to the amount of raw water.

When PAC is used, an optimum pH for forming flocculated floc (microfloc and larger floc) is within a range from 6 to 8, preferably within a range from 6.5 to 7.5. When PAC is dissolved in water, it is separated into a positively charged alkaline component and hydrogen ions, and the positively charged alkaline component is consumed during flocculation, decreasing the pH as more flocculated floc is formed. When the pH of the raw water doped with the PAC is less than 6 or more than 8, aluminum derived from the PAC or turbid components derived from the suspended solids may leak into the treated water of a downstream device.

Therefore, particularly when low basicity PAC is used, preferably a pH measurement device that measures the pH of the liquid to be treated in the reaction tank 17 is provided, and the pH of the liquid to be treated in the reaction tank 17 is controlled by feedback-controlling the amount of the pH adjusting agent supplied by the pH adjustment device using the pH value measured by the pH measurement device. When the reaction tank 17 is not used, the pH measurement device can be provided in the raw water transfer pipe 13. When a pH measurement device is used, preferably a plurality of pH measurement devices are provided at two or more locations and are each preferably installed at a preceding stage of the filtration membrane device in each stage to adjust the pH of the water supplied to the filtration membrane device in each stage. That is, in a case in which pH measurement devices are used in the production device 1 of the embodiment, preferably the pH measurement devices are provided at the preceding stage of the first ultrafiltration membrane device 14 and the preceding stage of the second ultrafiltration membrane device 24. An installation mode of the pH measurement device is not limited thereto, and the pH measurement device may be provided in any of the paths until the liquid to be treated that is doped with the PAC is supplied to the filtration device.

In the present embodiment, PAC having high basicity (hereinafter referred to as "high basicity PAC") is preferably used as the PAC. Even when high basicity PAC is used, the pH decreases with the formation of microfloc. However, the amount of decrease is so small that it does not pose a problem. The basicity of the high basicity PAC is preferably greater than 75%, more preferably greater than 83%. The upper limit of the basicity is typically less than about 84%. The high basicity PAC can be produced by, for example, the method described in JP 4104773 B. As the high basicity PAC, one type may be used, or two or more types may be used in combination. When two or more types are used in combination, the basicities of the two or more types of high basicity PACs may be the same or different, but the basicity of each high basicity PAC used is preferably 75% or greater, more preferably 83% or greater.

When high basicity PAC is used, suspended solids and the like in the raw water interact with the high basicity PAC to selectively form microfloc. Through the microfloc, adhesion of the residual aluminum to the membrane in the first ultrafiltration membrane device 14 and the second ultrafiltration membrane device 24 is significantly reduced, and the performance of the ultrafiltration membrane can be maintained over a long period of time. Further, the microfloc does not readily break even in the course of transfer using a pipe, a pump, or the like, and thus a decrease in the removal rate of turbidity is less likely to occur during multistage filtration membrane treatment. A microfloc is an aggregate of suspended solids and the like and high basicity PAC and has a size of from about 1 to 10 μm. The high basicity PAC is likely to form microfloc, but not likely to form coarse floc larger than microfloc or floc (nanofloc) finer than microfloc. Aluminum ions are not likely to leak out from the microfloc, and thus passing the aluminum ions through the microfloc can prevent the ultrafiltration membrane from clogging for an extended period.

Preferably, aluminum chloride pentahydroxide ($Al_2Cl(OH)_5$) is used as the high basicity PAC. Aluminum chloride pentahydroxide is polyaluminum chloride in which, in the above chemical formula (1), n=5 and m=1, and has a basicity of 83.3%. According to the aluminum chloride pentahydroxide, more homogeneous microfloc is readily formed. This is conceivably because aluminum chloride pentahydroxide has a high basicity and a low molecular weight.

The amount of the high basicity PAC is preferably 0.125 mg/L as $Al_2O_3$ or more with respect to a turbidity of 1 NTU in the raw water. Typically, the added amount of PAC is determined by the quality of the water to be treated, and an optimum added amount of PAC can be determined by a jar test. Specifically, the amount of the high basicity PAC is preferably 0.25 mg/L as $Al_2O_3$ or greater and 25 mg/L as $Al_2O_3$ or less, more preferably 0.3 mg/L as $Al_2O_3$ or greater and 22 mg/L as $Al_2O_3$ or less relative to the amount of raw water. In particular, in a case in which aluminum chloride pentahydroxide ($Al_2Cl(OH)_5$) is used as the high basicity PAC, preferably the amount of aluminum chloride pentahydroxide is 0.25 mg/L as $Al_2O_3$ or greater and 20 mg/L as $Al_2O_3$ or less relative to the total amount of raw water. Even when the amount of the high basicity PAC is small such as described above, the suspended solids in the raw water can be microflocculated. Further, the high basicity PAC functions even when in a small amount such as described above, facilitating the prevention of clogging of the ultrafiltration membrane device in a subsequent stage. Note that the notation "as $Al_2O_3$" indicates a value converted by using the concentration of aluminum oxide ($Al_2O_3$).

In a case in which high basicity PAC is used, the raw water and high basicity PAC are rapidly stirred in the reaction tank 17, making it easier to form more homogeneous microfloc without generating nanofloc. The stirring speed is, for example, preferably 150 s$^{-1}$ or higher, more preferably from 150 to 250 s$^{-1}$, and still more preferably 250 s$^{-1}$ or higher in terms of G value. Further, a stirring time with a rapid stirrer is 2 minutes or longer, preferably 3 minutes or longer, more preferably 6 minutes or longer. The higher the G value of the rapid stirring, the shorter the stirring time required.

Note that, when PAC is added, an inorganic flocculant or an organic polymer flocculant other than PAC may be used in combination as a flocculation aid. In this case, an added amount of the flocculation aid can be determined by a jar test.

Subsequently, the first treated water is supplied to and filtered by the first ultrafiltration membrane device 14. By providing a water supply pump in the raw water transfer pipe 13 downstream of the reaction tank 17, it is possible to supply the first treated water to the first ultrafiltration membrane device 14 by the water supply pump. In this case, the difference between inlet and outlet pressures of the first ultrafiltration membrane device 14 is preferably from 0.004 MPa to 0.04 MPa from the viewpoint of suppressing a decrease in a permeate flux in the first ultrafiltration membrane device 14. To increase the water recovery rate of the production device 1 on the whole, the water recovery rate in the first ultrafiltration membrane device 14 is preferably from 75% to 95%, more preferably from 80% to 95%, and still more preferably from 90% to 95%. As a result, the permeated water (first permeated water) and the concentrated water (first concentrated water) of the first ultrafiltration membrane device 14 are obtained. Note that a scale inhibitor or a bacteriostat may be added as appropriate to the first treated water immediately before the first treated water is supplied to the first ultrafiltration membrane device 14.

Subsequently, the first concentrated water is supplied to and filtered by the second ultrafiltration membrane device 24. In this case, the difference between inlet and outlet pressures of the second ultrafiltration membrane device 24 is preferably from 0.004 MPa to 0.04 MPa from the viewpoint of suppressing a decrease in a permeate flux in the second ultrafiltration membrane device 24. To increase the water recovery rate of the production device 1 on the whole, the water recovery rate in the second ultrafiltration membrane device 24 is preferably from 75% to 95%, more preferably from 80% to 95%, and still more preferably from 90% to 95%. As a result, the permeated water (second permeated water) and the concentrated water (second concentrated water) of the second ultrafiltration membrane device 24 are obtained. The first permeated water and the second permeated water thus obtained are collected and supplied as appropriate for pure water production as water for pure water.

The filtration membrane device in the preceding stage includes a filtration membrane capable of capturing microfloc as a filtration material. As such a filtration membrane, for example, a filtration membrane having a nominal pore diameter of from 0.1 μm to 5 μm can be used. Examples of such a filtration membrane include an ultrafiltration membrane and a microfiltration membrane, and an ultrafiltration membrane device is used in the present embodiment. In the present embodiment, the filter material is preferably an ultrafiltration membrane having a nominal pore diameter of from 0.001 to 0.1 μm. Examples of the ultrafiltration membrane provided in the first ultrafiltration membrane device 14 include a hollow fiber membrane, a spiral membrane, and a flat membrane made of a material such as cellulose acetate, aromatic polyamide, polyvinyl alcohol, polysulfone, or polyvinylidene fluoride. Among them, a hollow fiber membrane made of a fluorine-based material such as polyvinylidene fluoride (PVDF) or polytetrafluoroethylene (PTFE) is preferred. The first ultrafiltration membrane device 14 is preferably an external pressure-type ultrafiltration membrane device that uses a hollow fiber membrane.

Either a stand-alone-type or an immersion-type filtration membrane device may be used as the filtration membrane devices in the preceding stage and the subsequent stage. The stand-alone-type filtration membrane device is also called a pressure type, and is a device for performing high-pressure filtration by filling a pressure-resistant container with a filtration membrane, and is suitable for treatment of water having low turbidity. The stand-alone-type filtration membrane device has a large membrane area and can realize a high flow rate operation, and thus has the advantage that a large amount of water can be treated in a small installation area. The membrane included in the stand-alone-type filtration membrane is preferably a ceramic membrane or a membrane made of a fluorine-based material such as polyvinylidene fluoride (PVDF) or polytetrafluoroethylene (PTFE). The supply pressure of the stand-alone-type filtration membrane device can be set to any value so that the difference between the inlet and outlet pressures of the filtration membrane device is from 0.004 MPa to 0.04 MPa. The supply pressure to the stand-alone-type filtration membrane device is preferably greater than 0.03 MPa and less than or equal to 0.1 MPa.

The stand-alone-type filtration membrane device is effective in suppressing clogging of a downstream filtration membrane device because the downstream outflow of the nanofloc is small. In particular, when the method of the present embodiment is used to produce ultrapure water for the production of semiconductors or the like, with the use of stand-alone-type filtration membrane devices, two or more stand-alone-type filtration membrane devices can be installed in parallel for each stage. Then, by performing regeneration such as backwashing or module replacement of the plurality of devices one device at a time while continuing operation with the other devices (a so-called merry-go-round operation), it is possible to continue the production of ultrapure water without stopping the devices.

As the first ultrafiltration membrane device 14, preferably a stand-alone-type ultrafiltration membrane device is used. Examples of the ultrafiltration membrane provided in the stand-alone-type ultrafiltration membrane device include a hollow fiber membrane, a spiral membrane, and a flat membrane made of a material such as cellulose acetate, aromatic polyamide, polyvinyl alcohol, polysulfone, or polyvinylidene fluoride. Among them, a hollow fiber membrane made of a fluorine-based material such as polyvinylidene fluoride (PVDF) or polytetrafluoroethylene (PTFE) is preferred.

Examples of the stand-alone-type ultrafiltration membrane device include a cartridge-type device and a module-type device. The cartridge-type device has a configuration in which, for example, a cartridge of an ultrafiltration membrane is accommodated in a housing, piping is connected to a water passage port and a water discharge port that opens to the housing, and water is passed through the opening to the cartridge. The cartridge-type device has the advantage that, when the ultrafiltration membrane deteriorates, only the cartridge needs to be replaced. When using a stand-alone-type ultrafiltration membrane device, a water supply pump can be installed on the primary side (feed side) of the ultrafiltration membrane device in the first stage, allowing filtration to be carried out in the ultrafiltration membrane device in the second stage. Therefore, compared to a case in which a water supply pump is installed on the primary side of each ultrafiltration membrane device, destruction of floc by a pump can be suppressed to a minimum. Thus, when stand-alone-type ultrafiltration membrane devices in two stages are operated by one water supply pump on the primary side, preferably the supply pressure of the pump is set higher than a desired pressure to be realized in each ultrafiltration membrane device in consideration of the pressure loss in the course of passing through the piping and the filtration membranes. Further, to ensure that the pressure applied to the filtration membrane of each ultrafiltration membrane device does not become excessively high, preferably a pressure regulating valve such as a pressure reducing valve is installed on the secondary side (for example, the transfer pipe for the permeated water) of each ultrafiltration membrane device. As the pump to be installed on the primary side of the stand-alone-type ultrafiltration device, preferably a floc decomposition inhibiting pump capable of inhibiting the destruction of floc, such as a Hydrostal pump, a Hydrostal chemical pump, a hose pump, or a Mohno pump, is used.

The module-type device has a configuration in which an ultrafiltration membrane is provided inside a housing and water is passed through the ultrafiltration membrane by connecting the module to piping. The module-type device has the advantage that the entire module can be replaced when the filter medium has deteriorated, allowing the deteriorated ultrafiltration membrane to be cleaned on a per module basis.

The immersion-type filtration membrane device is a device configured for tank immersion, and is suitable for filtration of highly turbid raw water. The immersion-type filtration membrane device is immersed in a bottom portion of the reaction tank 17, and has the advantage that the first treated water doped with the PAC can be directly filtered without using piping. In the present embodiment, when high basicity PAC is used, microfloc is formed in the water, making it possible to directly perform filtration without precipitation removal by a flocculation sedimentation tank as used for coarse floc. This makes it possible to integrate the filtration membrane device by immersion in the reaction tank 17, and simplify the configuration of the entire device. When the immersion-type filtration membrane device is used, a low-pressure suction pump can be provided downstream of the filtration membrane devices in the plurality of stages, and the liquid to be treated can be supplied to the ultrafiltration membrane devices in the plurality of stages by the low-pressure suction pump and filtered. In this case, the pump is present downstream of the membrane treatment devices, resulting in the advantage that the collapse of floc due to impact at the time of pump operation is unlikely to occur. Therefore, in both cases of use of low basicity PAC and use of high basicity PAC, an immersion-type filtration membrane device can be used. Further, it is also possible to provide a water level difference on the secondary side (discharge side) of the filtration membrane devices in the plurality of stages and obtain permeated water by filtration by gravity. As a result, a large amount of energy is not consumed from the operation of a pump, making it possible to reduce operating costs.

When the immersion-type filtration membrane device is used as the ultrafiltration device, preferably the filtration membrane provided in the ultrafiltration membrane device is made of a ceramic or a fluorine-based material such as polyvinylidene fluoride (PVDF) or polytetrafluoroethylene (PTFE). Further, preferably the suction pressure is 0.004 MPa or greater and 0.03 MPa or less.

As the second ultrafiltration membrane device 24, an ultrafiltration membrane device similar to the first ultrafiltration membrane device 14 described above can be used, and the preferred mode is also similar. Features of the first ultrafiltration membrane device 14 and the second ultrafiltration membrane device 24 may be the same or different. As the first ultrafiltration membrane device 14 and the second ultrafiltration membrane device 24, commercially available products can be used. As a commercially available product, for example, HSU-1515 manufactured by Toray Industries, Inc., the hollow fiber membrane Microza UNA620A manufactured by Asahi Kasei Corporation, and the hollow fiber membrane Microza UHS-620A manufactured by Asahi Kasei Corporation can be used.

The water quality of the first permeated water and the second permeated water thus obtained is, for example, a turbidity of from 0.01 NTU to 0.4 NTU, an aluminum concentration of from 0 mg/L to 0.02 mg/L, a pH of from 5.9 to 7.5, and a conductivity of from 140 µS/cm to 270 µS/cm.

According to the production device 1 described above, the concentrated water produced by the first ultrafiltration membrane device 14 is filtered by the second ultrafiltration membrane device 24, making it possible to obtain permeated water of good purity and significantly improve the water recovery rate of the production device 1. The water recovery rate of the production device 1 obtained in this manner is, for example, 98% or greater, preferably 99% or greater, more preferably 99.5% or greater.

Figure 2:
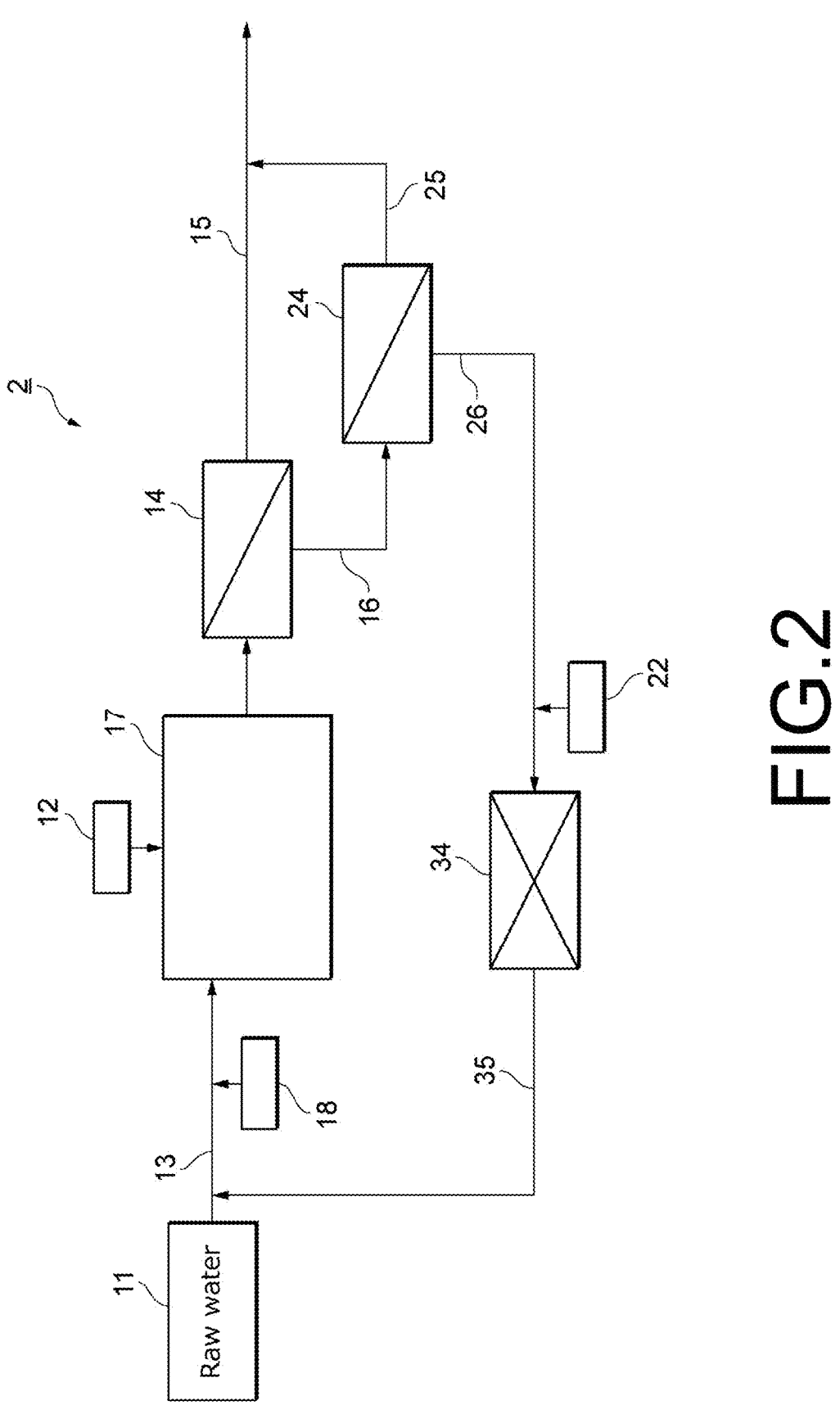
FIG. 2 is a view schematically illustrating a production device including, in addition to the production device illustrated in FIG. 1, an ultrafiltration membrane device that performs dead-end filtration.

Next, a production method for water for pure water according to a second embodiment will be described. FIG. 2 is a view schematically illustrating a production device 2 used in a production method for water for pure water according to the second embodiment. The production device 2 illustrated in FIG. 2 includes, at a subsequent stage of the concentrated water pipe 26, a third ultrafiltration membrane device 34 as a filtration membrane device in a third stage, and the second concentrated water is filtered by the third ultrafiltration membrane device 34. The production device 2 further includes a polyaluminum chloride supply device 22 that supplies polyaluminum chloride to the second concentrated water flowing through the concentrated water pipe 26. A permeated water transfer pipe 35 is connected to the third ultrafiltration membrane device 34. An end of the permeated water transfer pipe 35 on a side opposite to the third ultrafiltration membrane device 34 is connected to the raw water transfer pipe 13 upstream of the pH adjustment device 18. The other components are the same as those of the production device 1, and thus detailed description of components common to those of the production device 1 will be omitted.

The production of water for pure water using the production device 2 is performed as follows. As with the production device 1, raw water is accommodated in the reaction tank 17 via the raw water transfer pipe 13, PAC is added to the raw water, and then the water is supplied to the first ultrafiltration membrane device 14 and the second ultrafiltration membrane device 24, in this order. Then, as described above, in the production device 2, the polyaluminum chloride supply device 22 adds PAC to the second concentrated water while the second concentrated water flows through the concentrated water pipe 26. Note that, when an in-line mixer or the like for promoting the mixture of the second concentrated water and the PAC is installed in the concentrated water pipe 26 after the supply of PAC, clogging in the equipment of subsequent stages is further suppressed.

The second ultrafiltration membrane device 24 filters the concentrated water produced by the first ultrafiltration membrane device 14, thereby increasing the concentration of the floc, microfloc, and the like composed of suspended solids derived from the raw water and the PAC in the second concentrated water. The floc and microfloc may collapse in the course of flowing through the piping and pumps (not illustrated). Therefore, when the second concentrated water is directly filtered by the third ultrafiltration membrane device 34, aluminum derived from the PAC, suspended solids derived from the raw water, and the like contained in the floc may cause rapid clogging of the ultrafiltration membrane.

Therefore, in the production device 2 of the present embodiment, the second treated water obtained by adding polyaluminum chloride to the second concentrated water is supplied to the third ultrafiltration membrane device 34. The type and preferable mode of the PAC at this time are the same as those of the production device 1. Further, as with the production device 1, a reaction tank may be provided at the preceding stage of the third ultrafiltration membrane device 34, the polyaluminum chloride supply device 22 may be connected to the reaction tank, the second concentrated water may be accommodated in the reaction tank, and PAC may be added to the second concentrated water in the reaction tank.

In a case in which low basicity PAC is used, preferably a pH adjustment device is provided upstream of the polyaluminum chloride supply device 22 and a pH adjusting agent is added to the second concentrated water, as with the production device 1. As a result, the pH adjustment device can adjust the pH of the second concentrated water by adding an acid and an alkali as appropriate to the second concentrated water in accordance with the basicity of the low basicity PAC (pH adjustment process can be provided). The added amount of the pH adjusting agent at this time can be feedback-controlled on the basis of a measured value obtained by providing a pH measurement device and measuring the pH of the second concentrated water before the addition of PAC, as with the production device 1.

When high basicity PAC is used, it is not necessary to adjust the pH of the second concentrated water. When high basicity PAC is added to the second treated water, the suspended solids in the second treated water and the high basicity PAC interact with each other to form microfloc. Through the microfloc, clogging of the membrane of the third ultrafiltration membrane device 34 is markedly suppressed, making it possible to maintain the performance of the ultrafiltration membrane for a long period of time. Further, through experiments by the present inventors, it has been found that, when high basicity PAC is used, the total organic carbon (TOC) in the third permeated water is reduced as compared with a case in which low basicity PAC is used.

Subsequently, the second treated water is filtered by the third ultrafiltration membrane device 34. The filtration in the third ultrafiltration membrane device 34 is dead-end filtration, making it possible to improve the water recovery rate in the production device 2. Note that, in the present embodiment, dead-end filtration includes a range substantially equivalent to dead-end filtration, that is, a range in which almost no concentrated water is generated, and represents, for example, a case in which the water recovery rate exceeds 98%. Preferably, the difference between the inlet and outlet pressures of the third ultrafiltration membrane device 34 is from 0.004 MPa to 0.04 MPa. Further, preferably the water supply pressure to the third ultrafiltration membrane device 34 is from 0.03 MPa to 0.1 MPa. In this way, a third permeated water is obtained as permeated water of the third ultrafiltration membrane device 34.

The filtration membrane device in the third stage includes, for example, a filtration membrane having a nominal pore diameter of from 0.001 to 0.1 μm as a filtration material. Examples of such a filtration membrane include an ultrafiltration membrane and a microfiltration membrane, and an ultrafiltration membrane device is used in the present embodiment. In the present embodiment, the filter material is preferably an ultrafiltration membrane having a nominal pore diameter of from 0.001 to 0.1 μm. Examples of the ultrafiltration membrane provided in the third ultrafiltration membrane device 34 include a hollow fiber membrane, a spiral membrane, and a flat membrane made of a material such as cellulose acetate, aromatic polyamide, polyvinyl alcohol, polysulfone, or polyvinylidene fluoride. Among them, a hollow fiber membrane made of a fluorine-based material such as polyvinylidene fluoride (PVDF) or polytetrafluoroethylene (PTFE) is preferred. The third ultrafiltration membrane device 34 is preferably an external pressure-type ultrafiltration membrane device that uses the hollow fiber membrane.

As the third ultrafiltration membrane device 34, preferably a stand-alone-type ultrafiltration membrane device is used. By using the stand-alone-type ultrafiltration membrane device, two or more stand-alone-type ultrafiltration membrane devices can be installed in parallel in the third ultrafiltration membrane device 34 of the third stage, and by performing regeneration such as backwashing or module replacement for each of the plurality of devices one device at a time and continuing operation by the other devices (so-called merry-go-round operation), it is possible to continue production of ultrapure water without stopping the equipment. Further, as the pump to be installed on the primary side of the stand-alone-type ultrafiltration device, preferably a floc decomposition inhibiting pump capable of inhibiting the destruction of floc, such as a Hydrostal pump, a Hydrostal chemical pump, a hose pump, or a Mohno pump, is used.

Subsequently, the third permeated water is returned to the upstream side of the reaction tank 17 through the transfer pipe 35 and is treated again as the raw water 11.

According to the production device 2 described above, the second concentrated water doped with the PAC is filtered by the third ultrafiltration membrane device 34, making it possible to obtain the third permeated water having good purity and significantly improve the water recovery rate in the production device 2. The water recovery rate in the production device 2 thus obtained is, for example, 99% or higher, preferably 99.5% or higher. Further, floc is formed from the suspended solids remaining in the second concentrated water by using PAC, making it possible to significantly reduce the residual aluminum and the residual suspended solids in the third permeated water. Furthermore, when high basicity PAC is used, the total organic carbon (TOC) in the third permeated water can be reduced. This makes it possible to improve the quality of raw water to be treated in the production device 2 and thus reduce the amount of chemicals used and efficiently produce water for pure water of good quality.

Note that the reason that the TOC is efficiently reduced in the filtration membrane devices in the second and subsequent stages is presumably as follows. In the ultrafiltration membrane device in the first stage, the suspended solid component and the PAC preferentially react with each other to form floc. This is because the reaction rate between the turbid component and the PAC is faster than the reaction rate between the TOC and the PAC. Then, when PAC is added upstream of the ultrafiltration membrane devices in the second and subsequent stages, conceivably most of the suspended solid component in the concentrated water produced by the filtration membrane device in the first stage is in a floc state, and thus the TOC and the PAC in the concentrated water are bonded to each other and removed by the filtration membrane.

Figure 3:
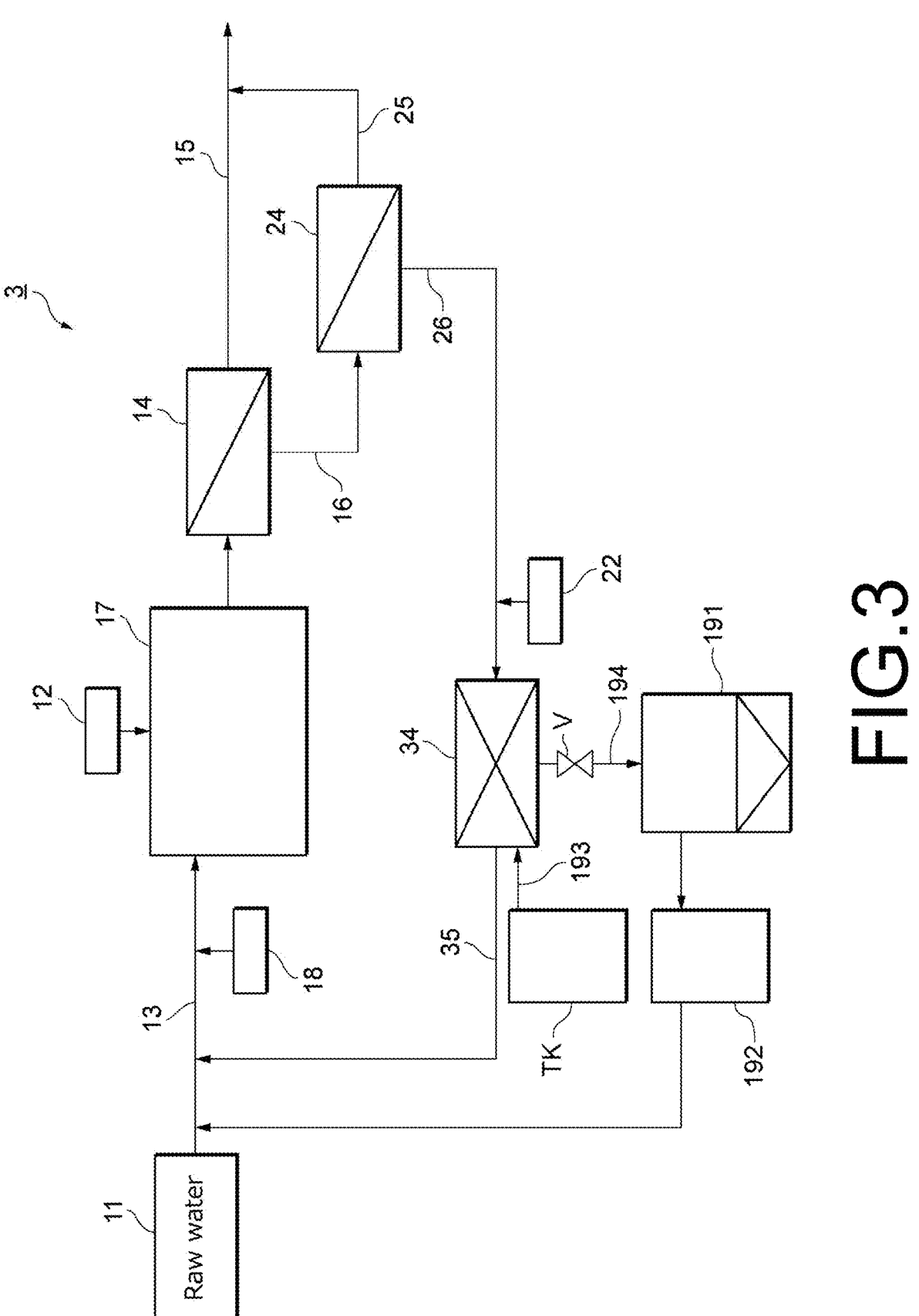
FIG. 3 is a view schematically illustrating a production device including, in addition to the production device illustrated in FIG. 2, a cleaning device of the ultrafiltration membrane device that performs the dead-end filtration.

Next, another embodiment of the present invention will be described. FIG. 3 schematically illustrates a production device 3 used in a production method for water for pure water according to the present embodiment. The production device 3 is a device for reusing wash water in a case in which the third ultrafiltration membrane device 34 is cleaned. The production device 3 is provided with a sedimentation concentration device 191 that separates the wash water into a high concentration waste liquid and a supernatant, and a transfer device 192 that stores and supplies the supernatant to the raw water transfer pipe 13. Further, the production device 3 includes a tank TK that stores water for cleaning (backwashing), a backwashing pipe 193 that supplies the water for cleaning in the tank TK to the third ultrafiltration membrane device 34, a backwashing pipe 194 that feeds the wash water discharged from the third ultrafiltration membrane device 34 to the sedimentation concentration device 191, and a valve V interposed in the backwashing pipe 194. The other components are the same as those of the production device 2 illustrated in FIG. 2, and thus redundant description thereof will be omitted. The transfer device 192 includes, for example, a tank that stores the supernatant, and a pump and a pipe that transfer the supernatant.

In the production device 3, part of the second concentrated water is collected as water for cleaning (backwashing) from the concentrated water pipe 26 and stored in the tank TK. The remainder of the second concentrated water is fed to the subsequent stage as water to be treated, and the polyaluminum chloride supply device 22 adds PAC to the water to be treated. With the valve V closed, the third ultrafiltration membrane device 34 continues dead-end filtration of the second concentrated water (water to be treated) doped with the PAC. After dead-end filtration of the second concentrated water (water to be treated) is continued, the third ultrafiltration membrane device 34 is chemically cleaned when clogging develops. The chemical cleaning is performed, for example, as follows. First, sodium hydroxide (NaOH) is added to the water for cleaning in the tank TK to generate alkaline cleaning water containing sodium hydroxide as a main component, and then the valve V is opened to pass the alkaline cleaning water through the ultrafiltration membrane device from the secondary side during filtration. Subsequently, phosphoric acid ($H_3PO_4$) is added to the water for cleaning in the tank TK to generate acidic cleaning water containing phosphoric acid as a main component, and the acidic cleaning water is passed through the ultrafiltration membrane device from the secondary side during filtration. As chemicals, in addition to the above, potassium hydroxide and ammonia can be used as the alkaline cleaning water; sulfuric acid, hydrochloric acid, oxalic acid, and citric acid can be used in place of the acidic cleaning water; and sodium hypochlorite can be used as an oxidizing agent, depending on the membrane deposits to be cleaned. The chemical cleaning is carried out by mixing chemicals with the water for cleaning collected as described above, and using the obtained alkaline cleaning water, acidic cleaning water, or the like. The frequency of chemical cleaning is typically about once every 14 to 21 days. The wash water generated thereby is accommodated in the sedimentation concentration device 191 through the backwashing pipe 194, and is separated into a supernatant and a concentrated liquid in the sedimentation concentration device 191. The separated supernatant is temporarily stored in the transfer device 192 and then supplied to the raw water transfer pipe 13 for reprocessing.

According to the production device 3 of the present embodiment, it is possible to realize a reduction in the amount of wastewater by using the wash water as raw water while quickly eliminating, by chemical cleaning, clogging caused when the third ultrafiltration membrane device 34 performs dead-end filtration. Note that, the first ultrafiltration membrane device 14 and the second ultrafiltration membrane device 24 may similarly be provided with a device for cleaning the device and reusing the wash water.

Figure 7:
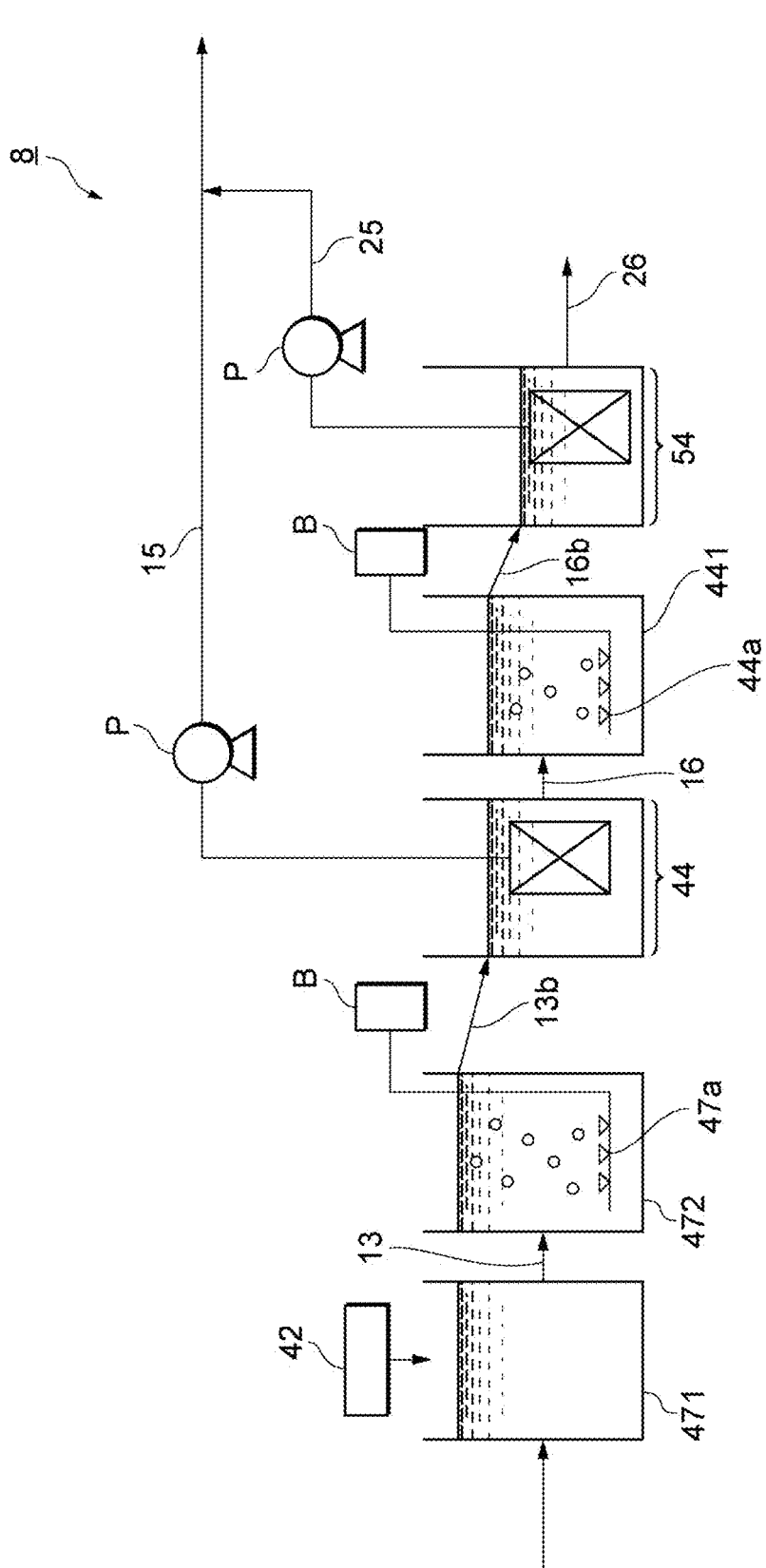
FIG. 7 is a view schematically illustrating a production device that uses a system in which water to be treated is transferred to a subsequent stage using a blower and a bubbling tank.

Next, a production device 8 that uses a blower and a bubbling tank will be described. FIG. 7 is a view schematically illustrating the production device 8 that uses a system in which the water to be treated that is doped with PAC is transferred to a subsequent stage using a blower and a bubbling tank. The production device 8 includes a reaction tank 471 that accommodates raw water, a polyaluminum chloride supply device 42 that supplies PAC into the reaction tank 471, and the raw water transfer pipe 13 that transfers the raw water. The production device 8 includes a bubbling tank 472 at a subsequent stage of the reaction tank 471. An air diffusion pipe 47a is provided at a bottom portion of the bubbling tank 472. The production device 8 includes a blower B for feeding air to the air diffusion pipe, and the blower B and the air diffusion pipe 47a are connected by a pipe.

The production device 8 further includes an ultrafiltration membrane device 44 in a first stage that filters the raw water (first treated water) doped with PAC. The transfer pipe 15 that transfers the permeated water to the subsequent stage and the concentrated water pipe 16 that discharges the concentrated water are connected to the ultrafiltration membrane device 44 in the first stage. A suction pump P is interposed in the transfer pipe 15.

The production device 8 further includes a bubbling tank 441 that accommodates the concentrated water (first concentrated water) of the ultrafiltration membrane device 44 in the first stage. An air diffusion pipe 44a is provided at a bottom portion of the bubbling tank 441. The production device 8 includes the blower B for feeding air to the air diffusion pipe 44a, and the blower B and the air diffusion pipe 44a are connected by a pipe.

The production device 8 further includes an ultrafiltration membrane device 54 in a second stage that filters the first concentrated water. The transfer pipe 25 that transfers the permeated water to the subsequent stage and the concentrated water pipe 26 that discharges the concentrated water are connected to the ultrafiltration membrane device 54 in the second stage. The suction pump P is interposed in the transfer pipe 25.

Each of the ultrafiltration membrane device 44 in the first stage and the ultrafiltration membrane device 54 in the second stage includes an immersion tank and an ultrafiltration membrane immersed in the immersion tank. The bubbling tank 472 and the immersion tank in which the ultrafiltration membrane device 44 in the first stage is immersed are connected by a transfer pipe 13b, and the bubbling tank 441 and the ultrafiltration membrane device 54 in the second stage are connected by a concentrated water pipe 16b. Both of the transfer pipe 13b and the concentrated water pipe 16b are inclined, making a preceding stage side higher than a subsequent stage side so that water flows from the preceding stage to the subsequent stage by its own weight.

In the bubbling tank 472, air supplied from the blower B is bubbled from the air diffusion pipe 47a. In the bubbling tank 472, air bubbles float upward in the water, causing the floc to float upward to the vicinity of a water surface of the bubbling tank 472. The transfer pipe 13b is connected in the vicinity of the water surface of the bubbling tank, and thus the treated water containing floc is fed to the ultrafiltration membrane device 44 in the first stage by its own weight via the transfer pipe 13b having a subsequent stage inclined downward. In the ultrafiltration membrane device 44 in the first stage, the permeated water is suctioned by the suction pump P, and the concentrated water is fed to the bubbling tank 441 through the concentrated water pipe 16.

In the bubbling tank 441, air supplied from the blower B is bubbled from the air diffusion pipe 44a. In the bubbling tank 441, air bubbles float upward in the water, causing the floc to float upward to the vicinity of a water surface of the bubbling tank 441. The transfer pipe 16b is connected in the vicinity of the water surface of the bubbling tank 441, and thus the treated water containing floc is fed to the ultrafiltration membrane device 54 in the second stage by its own weight via the transfer pipe 16b having a subsequent stage inclined downward. In the ultrafiltration membrane device 54 in the second stage, the permeated water is suctioned by the suction pump P, and the concentrated water is fed to the subsequent stage via the concentrated water pipe 26.

A method exists in which the treated water containing floc generated by the addition of PAC to the raw water is suctioned or fed and transferred to a subsequent stage by a pump. In the production device 8 of a system that uses a blower for transfer to the subsequent stage as illustrated in FIG. 7, bubbling is applied to the treated water containing floc, causing the floc to float upward to an upper portion of the reaction tank. The treated water containing floc can then flow by its own weight to the subsequent stage through piping connected to the upper portion of the reaction tank and inclined downward towards the subsequent stage. This method is particularly suitable in a case in which low basicity PAC is used, but is also suitably applicable to a case in which high basicity PAC, which produces microfloc that is unlikely to break, is used. Note that, in the production device 8, components common to those of the production devices 1 to 3 and a production device 4 described below are denoted by the same reference signs, and detailed description thereof will be omitted.

Figure 4:
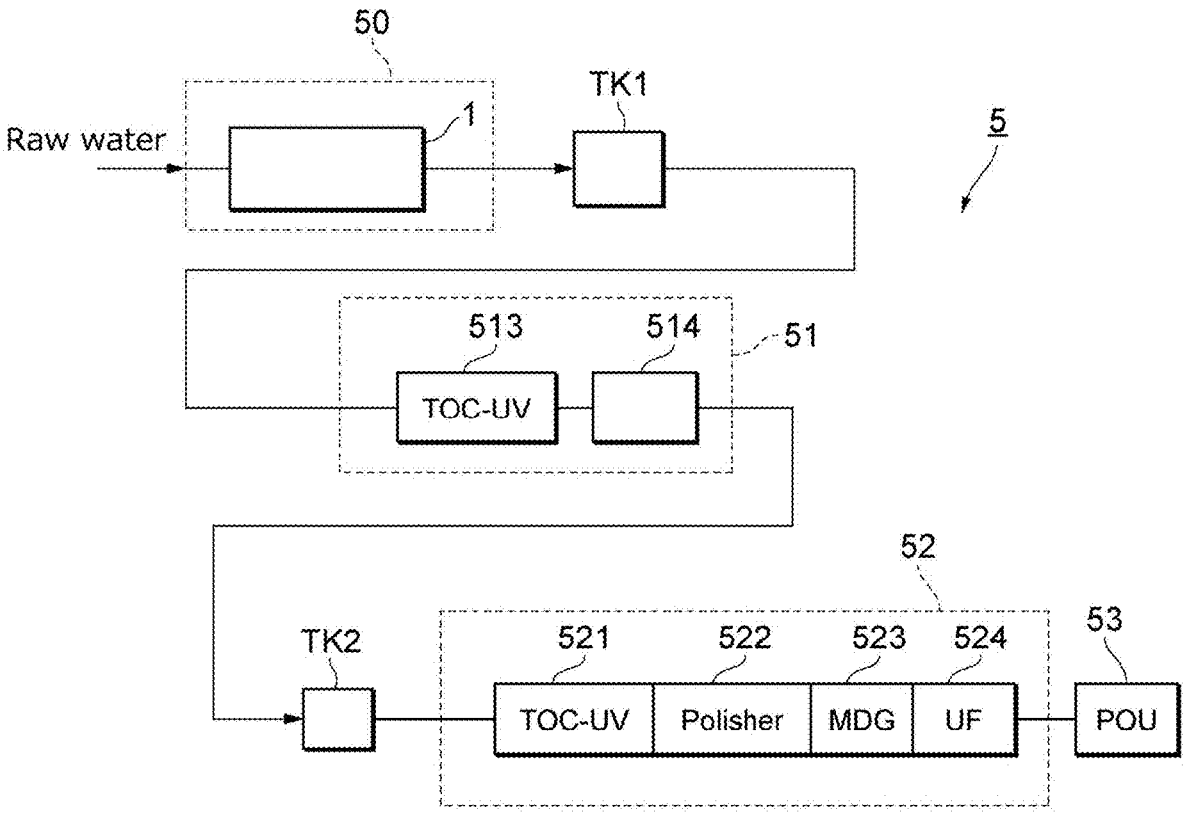
FIG. 4 is a diagram schematically illustrating a pure water production system that uses the production device for water for pure water according to the embodiment.

Next, a ultrapure water production system 5 according to an embodiment that uses the production device 1 described above will be described with reference to FIG. 4. FIG. 4 is a block diagram schematically illustrating a configuration of the ultrapure water production system 5 that uses the production device 1. In FIG. 4, the production device 1 can be changed to any one of the production devices 2 to 3.

As illustrated in FIG. 4, the ultrapure water production system 5 produces pure water or ultrapure water using the water for pure water obtained by the production device 1. The ultrapure water production system 5 includes a pretreatment system 50, a primary pure water system (pure water production system) 51, and a secondary pure water system (subsystem) 52, in this order. The secondary pure water system 52 is connected to a point of use (POU) 53 by a pipe, and supplies ultrapure water produced by the ultrapure water production system 5 to the POU 53.

The pretreatment system 50 includes the production device 1 of the embodiment described above and, as necessary, a prefilter, a heat exchanger for temperature adjustment, and the like.

The ultrapure water production system 5 includes a tank TK1 at a subsequent stage of the pretreatment system 50. The water to be treated that has been pretreated by the pretreatment system 50 is introduced into the tank TK1, temporarily stored therein, and then supplied to the primary pure water system 51.

The primary pure water system 51 removes organic matter, ion components, and dissolved gases from the pretreated water to produce primary pure water. The primary pure water system 51 includes an ultraviolet oxidation device (TOC-UV) 513 and an ion exchange device 514, in this order.

The ultraviolet oxidation device 513 includes, for example, an ultraviolet lamp that emits ultraviolet rays having wavelengths near 185 nm and ultraviolet rays having wavelengths near 254 nm, and the water to be treated is irradiated with ultraviolet rays from this ultraviolet lamp, thereby oxidizing and decomposing the total organic carbon (TOC) in the water to be treated. Water is decomposed by the ultraviolet rays radiated from the ultraviolet oxidation device 513 to generate OH radicals, and organic substances in the water to be treated are oxidized and decomposed into organic acids by the OH radicals. The amount of ultraviolet irradiation in the ultraviolet oxidation device 513 of the primary pure water system can be changed as appropriate, depending on the water quality of the water to be treated.

The ion exchange device 514 is at least one of an ion exchange resin device and an electrical deionization device. As the ion exchange resin device, one or more types selected from a cation exchange resin device, an anion exchange resin device, a mixed bed type ion exchange resin device, and a double bed type ion exchange resin device can be used in combination as appropriate in accordance with the required water quality. A cation exchange resin used in the cation exchange resin device may be a strongly acidic cation exchange resin or a weakly acidic cation exchange resin. An anion exchange resin used in the anion exchange resin device may be a strongly basic anion exchange resin or a weakly basic anion exchange resin. As the ion exchange resin, a boron-adsorbent ion exchange resin may be used.

The primary pure water obtained by the primary pure water system 51 has, for example, a resistivity of 17 MΩ·cm or greater and a TOC concentration of 10 μg C/L or less.

The ultrapure water production system 5 includes a primary pure water tank TK2 that stores primary pure water and the secondary pure water system 52, in this order, at a subsequent stage of the primary pure water system 51. The primary pure water produced by the primary pure water system is temporarily stored in the primary pure water tank TK2 and then fed to the secondary pure water system 52. The secondary pure water system 52 includes an ultraviolet oxidation device (TOC-UV) 521, a non-regenerative polisher 522, a membrane degasification device (MDG) 523, and an ultrafiltration membrane device (UF) 524.

The configuration of the ultraviolet oxidation device 521 of the secondary pure water system 52 is the same as that of the ultraviolet oxidation device 513 of the primary pure water system 51. The non-regenerative polisher 522 is a mixed bed type ion exchange resin device consisting of a cylinder or other container filled with a mixture of a strongly acidic cation exchange resin and a strongly basic anion exchange resin. The non-regenerative polisher 522 adsorbs and removes ionic components generated by the ultraviolet oxidation device 521 decomposing organic substances.

The membrane degasification device 523 removes dissolved gases through a degasification membrane. The membrane degasification device 523 removes a trace amount of dissolved oxygen in the primary pure water to reduce the dissolved oxygen concentration to, for example, about 1 μg/L or less. The ultrafiltration membrane device 524 performs filtration using an ultrafiltration membrane to remove trace amounts of eluate and fine particle components from the ion exchange resin upstream, thereby reducing the number of fine particles of 0.05 μm or greater to about 250 pcs/L or less, for example.

In this way, the secondary pure water system 52 treats the primary pure water to produce ultrapure water of higher purity. The ultrapure water has, for example, a total organic carbon (TOC) concentration of 1 μg C/L or less, a resistivity of 18 MΩ·2 cm or greater, and a boron concentration of 0.1 ppb (μg/L) or less. The ultrapure water produced by the secondary pure water system is supplied to the point of use 53.

Note that, in each of the embodiments described above, the water quality of raw water and treated water can be measured by the following methods or devices.

Turbidity: Light-scattering system

Aluminum concentration: Inductively coupled plasma (ICP) emission spectrometry pH: Electrode method Conductivity: Conductivity meter (HE-960CW manufactured by Horiba, Ltd.)

Total organic carbon (TOC) concentration: TOC meter (except ultrapure water: Sievers M9e manufactured by Suez)

EXAMPLES

Next, examples will be described. The present invention is not limited to the examples below.

Figure 5:
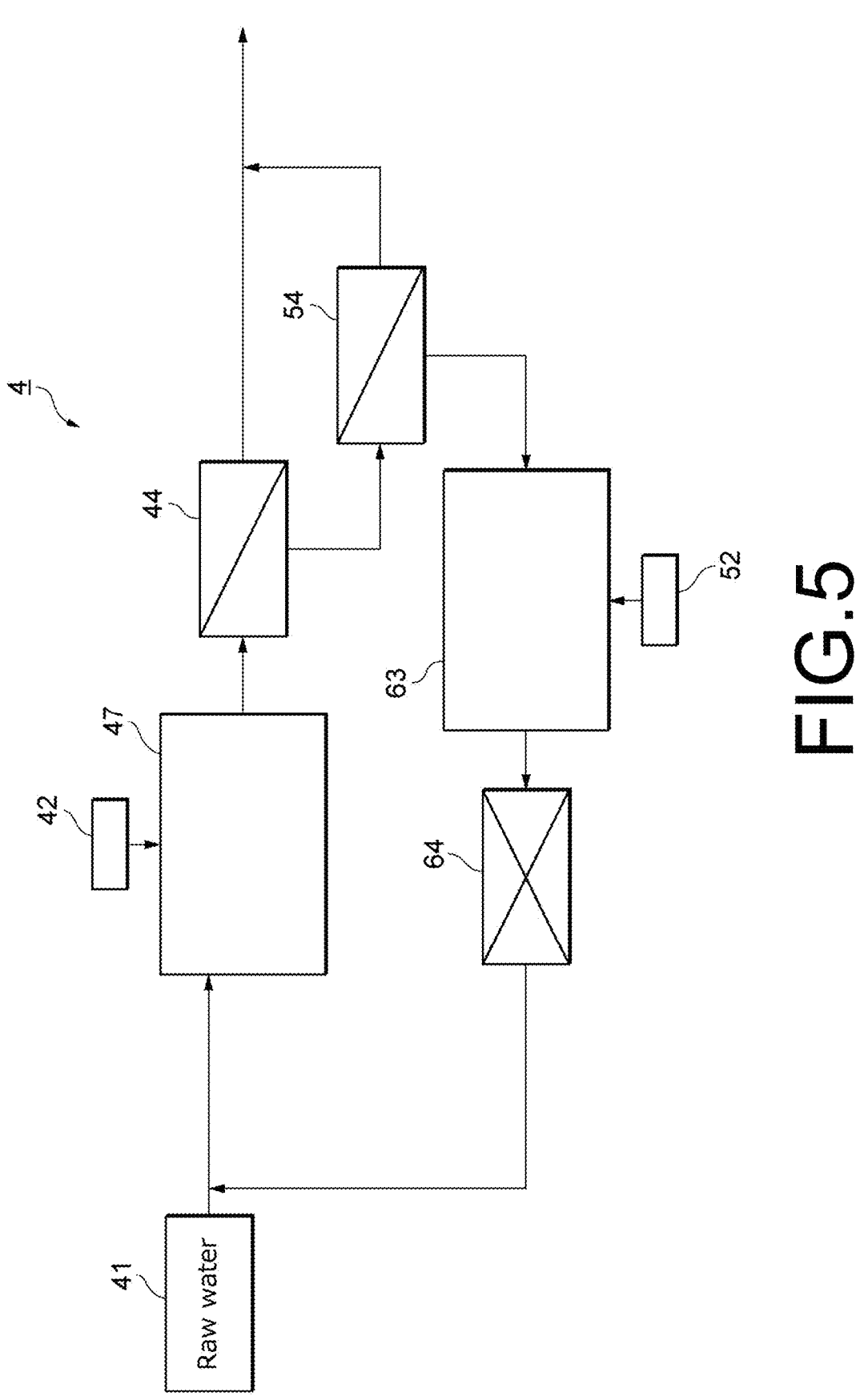
FIG. 5 is a view schematically illustrating a production device for water for pure water used in an example.

FIG. 5 schematically illustrates the production device 4 for water for pure water used in the examples and comparative examples. The production device 4 illustrated in FIG. 5 includes a raw water supply device 41 that supplies raw water, the polyaluminum chloride supply devices 42, 52 that supply PAC, and the reaction tank 47 supplied with raw water and high basicity PAC. The production device 4 further includes, downstream of the reaction tank 47, the ultrafiltration membrane device 44, the ultrafiltration membrane device 54 that treats concentrated water produced by the ultrafiltration membrane device 44, and an ultrafiltration membrane device 64 that treats concentrated water produced by the ultrafiltration membrane device 54. A reaction tank 63 that accommodates the concentrated water produced by the ultrafiltration membrane device 54, which is a second stage filtration membrane device, is provided at a preceding stage of the ultrafiltration membrane device 64. In the production device 4, the polyaluminum chloride supply device 42 supplies PAC into the reaction tank 47, and the polyaluminum chloride supply device 52 supplies PAC into the reaction tank 63.

The specifications of each device used in the examples and experimental examples are as follows.

Reaction tank 47: Volume 1 m³

Ultrafiltration membrane devices 44, 54: ZeeWeed 500 Membrane (immersion-type membrane: PVDF membrane, nominal pore diameter: 0.04 μm) manufactured by Veolia Ultrafiltration membrane device 64: Puria GL manufactured by Kuraray Co., Ltd. (pressure-type membrane: PVDF membrane, nominal pore diameter: 0.02 μm)

Measurement of aluminum concentration: High-frequency inductively coupled plasma (ICP) emission spectrometry Measurement of turbidity: Turbidimeter (Hach 2100P, manufactured by DKK-TOA Corporation)

Measurement of pH: Water quality meter (Horiba D200, manufactured by Horiba)

Measurement of TOC: TOC meter (M9e by Suez)

Water quality of raw water (lake water): Turbidity 2.2 NTU, pH=8.0, aluminum concentration 0.019 mg/L, conductivity 250 μS/cm, TOC 2 mg/L

Example 1

Raw water was supplied to the reaction tank 47. Subsequently, an aqueous solution of aluminum chloride pentahydroxide ($Al_2Cl(OH)_5$) (Nomura Micro Science Co., Ltd. prototype, basicity: 83.33%) was supplied and stirred into the reaction tank 47 as high basicity PAC by the polyaluminum chloride supply device 42 so that the aluminum concentration in the raw water was 2 mg/L in terms of $Al_2O_3$ concentration. After stirring, the raw water was sampled, an 80-ml portion of the raw water was passed through a membrane (size: φ 47 mm) having a nominal pore diameter of 0.2 μm, and fine particles trapped in the membrane were observed to be from about 1 to 10 μm in size. When elemental components of the fine particles were confirmed by energy dispersive X-ray fluorescence spectroscopy (EDX), Al was found to be contained. Furthermore, when the same amount of water was passed through a membrane (size: φ 47 mm) having a nominal pore diameter of 0.45 μm, there was substantially no differential pressure. From the above results, it was confirmed that microfloc was formed in the present Example.

The treated water in the reaction tank 47 was passed through and filtered by the ultrafiltration membrane device 44 to obtain first permeated water and first concentrated water. The first concentrated water was passed through and filtered by the ultrafiltration membrane device 54 to obtain second permeated water and second concentrated water. The first permeated water and the second permeated water were recovered through piping. Subsequently, the second concentrated water was accommodated in the reaction tank 63, the same high basicity PAC as described above was added by the polyaluminum chloride supply device 52 so that the aluminum concentration in the water was 20 mg/L in terms of $Al_2O_3$ concentration, and the water was passed through and dead-end-filtered by the ultrafiltration membrane device 64 to obtain third permeated water. The third permeated water was mixed with the raw water and reprocessed, and these processes were repeated. The water recovery rates of the ultrafiltration membrane device 44 (first stage) and the ultrafiltration membrane device 54 (second stage) were both set to 90%, and the suction pressure was set to 10 kPa for the first stage and 5 kPa for the second stage.

Example 2

Low basicity PAC (trade name: PAC250A, manufacturer: Taki Chemical Co., Ltd., basicity: 51%) was used and added in place of the high basicity PAC in Example 1 so that the aluminum concentration in the raw water was 2 mg/L in terms of $Al_2O_3$ concentration, and the aluminum concentration in the second concentrated water after the addition of PAC (supply water of ultrafiltration membrane device 64 (third stage)) was 20 mg/L in terms of $Al_2O_3$ concentration. Further, the process was repeated in the same manner as in Example 1 except that a pH adjusting agent (sulfuric acid and an aluminum hydroxide aqueous solution) was added to the raw water and the second concentrated water at the time of the PAC addition to adjust the pH to be from 6.5 to 7.5.

Comparative Example 1

The process was repeated in the same manner as in Example 2 except that the pH adjustment in Example 2 was not performed. The pH of the supply water of the ultrafiltration membrane device 64 (third stage) was 5.8.

In Comparative Example 1, the aluminum concentration of the third permeated water was approximately 25 times that of the raw water, the turbidity component was approximately 17 times that of the raw water, and the TOC concentration was 1.5 times that of the raw water. Thus, the water quality was worse than that of the raw water. Therefore, the third permeated water could not be returned to the upstream side of the reaction tank 47. This is because, when the third permeated water having a water quality worse than that of the raw water is returned to the upstream side of the reaction tank 47, the water quality of the raw water is likely to gradually deteriorate, and the membrane is likely to become clogged with a turbid component derived from the raw water. Further, in a preliminary experiment conducted prior to the present Comparative Example, when treatment was performed with a water recovery rate of the ultrafiltration membrane devices in the two stages on the whole set to 99%, membrane clogging frequently occurred in the ultrafiltration membrane device 44 and particularly in the ultrafiltration membrane device 54. Therefore, on the basis of the results of the preliminary experiment, in the present Comparative Example, the operation was performed so that the water recovery rate of the ultrafiltration membrane devices in the two stages on the whole was 90%.

Comparative Example 2

Figure 6:
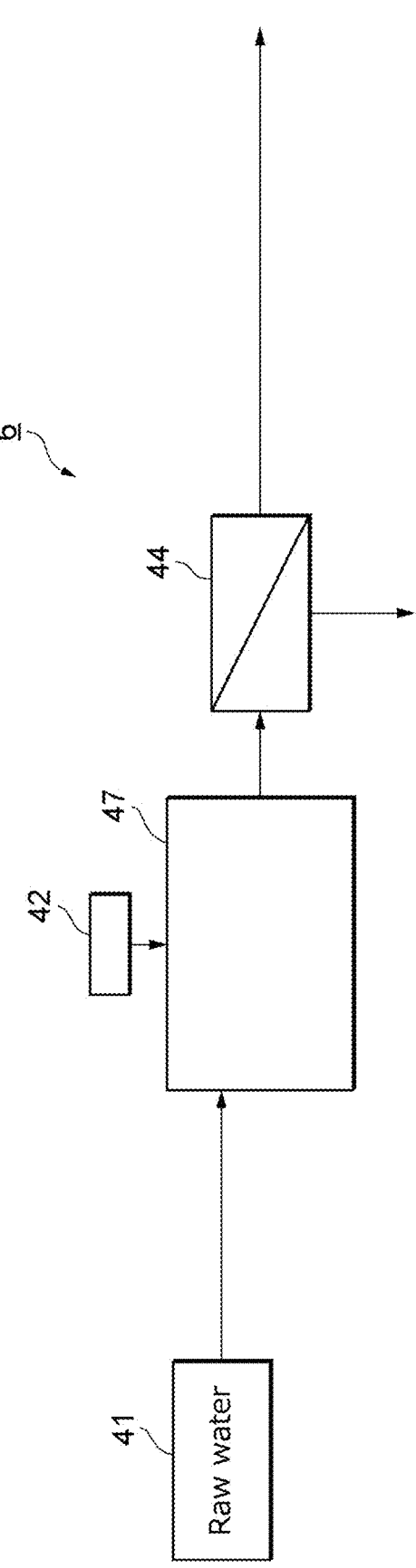
FIG. 6 is a view schematically illustrating a device used in a comparative example.
Figure 6:

FIG. 6 illustrates a production device 6 for water for pure water in the related art and used in the present Comparative Example. The production device 6 differs from the production device 4 in not including the ultrafiltration membrane device 54 and the ultrafiltration membrane device 64. Using the production device 6, sulfuric acid was added to the raw water as a pH adjusting agent to adjust the pH of the supply water of the ultrafiltration membrane device 44 to 7.2, and then the supply water was passed through and filtered by the ultrafiltration membrane device 44 as in Comparative Example 1 to obtain first permeated water and first concentrated water. Otherwise, the process was repeated as in Comparative Example 1.

The turbidity (NTU) and aluminum concentration of the mixture of the first permeated water and the second permeated water, the TOC concentration, turbidity, and aluminum concentration of the third permeated water, and the overall water recovery rate of the device were measured for Examples 1 and 2, and the Comparative Examples. The results are shown in Table 1. In Table 1, the mixture of the first permeated water and the second permeated water is indicated as "first permeated water and second permeated water". Note that the value of the "First permeated water and second permeated water quality" of Comparative Example 2 represents the quality of only the "first permeated water" because Comparative Example 2 was processed by a single-stage ultrafiltration membrane device.

TABLE 1

| | PAC basicity (%) | First permeated water and second permeated water quality | | Third permeated water | | | Total |
| | | Turbidity | Aluminum concentration (mg/L) | Turbidity | Aluminum concentration (mg/L) | TOC concentration (mg/L) | water recovery rate (%) |
|---|---|---|---|---|---|---|---|
| Example 1 | 83.3 | 0.34 | 0.001 | 1 | 0.01 | 1.70 | 99.53 |
| Example 2 | 51 | 0.39 | 0.01 | 2.2 | 0.019 | 2.50 | 99.53 |
| Comparative Example 1 | 51 | 0.8 | 0.25 | 35 | 0.5 | 3.10 | 90 |
| Comparative Example 2 | 51 | 0.6 | 0.2 | | | | 83 |

Experimental Examples

The TOC concentrations of permeated water when high basicity PAC was added to the raw water, the first concentrated water, and the second concentrated water in Example 1 and filtered by an ultrafiltration device were compared.

Figure 8:
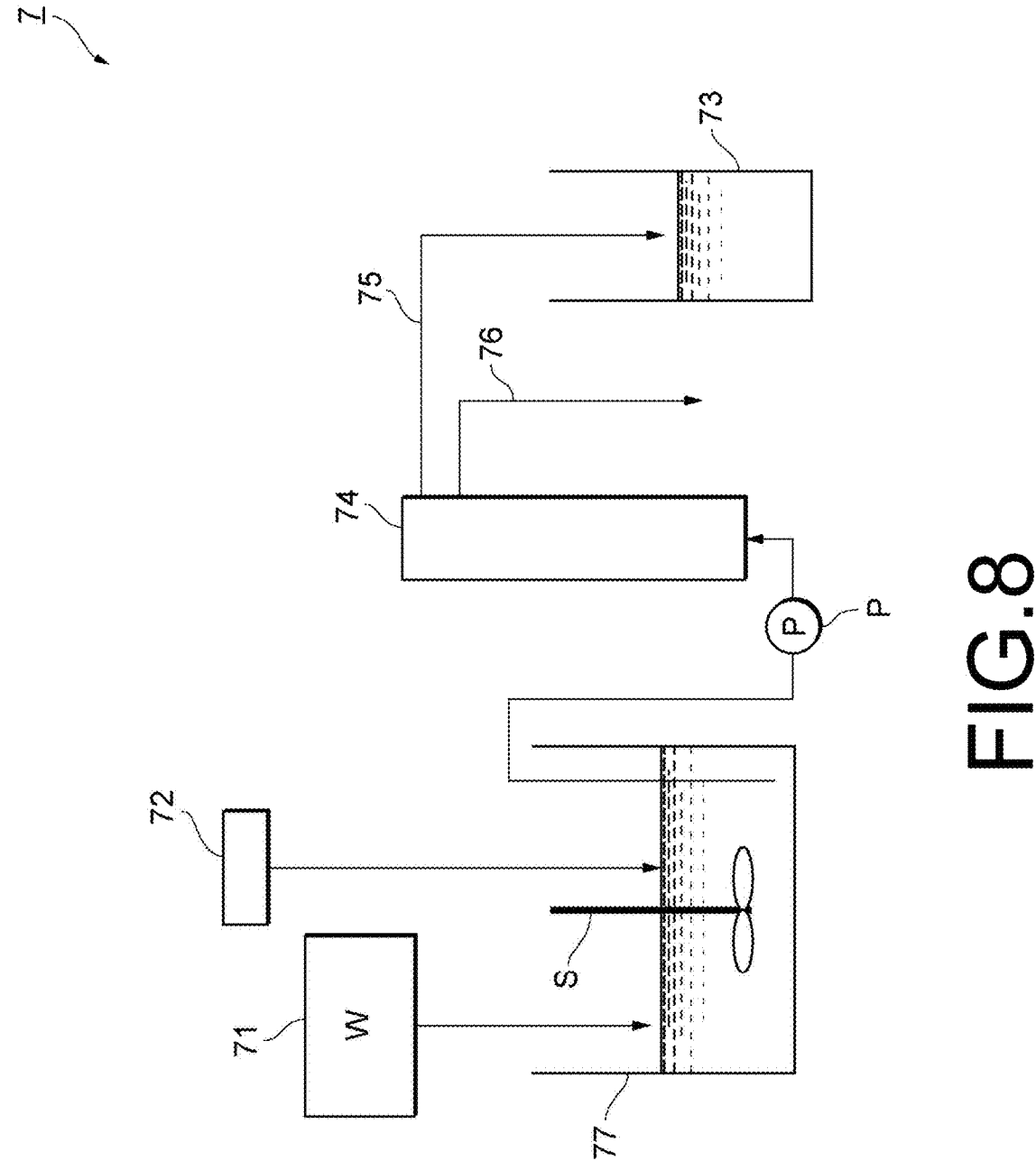
FIG. 8 is a view schematically illustrating a test device used in an experimental example.

FIG. 8 schematically illustrates a test device 7 used in the Experimental Examples. The test device illustrated in FIG. 8 includes a supply device 71 that supplies water to be treated, a reaction tank 77 that accommodates the water to be treated and PAC, a polyaluminum chloride supply device 72 that adds a predetermined amount of high basicity PAC to the reaction tank 77, and a stirrer S that stirs the water to be treated in the reaction tank 77. The test device 7 further includes the pump P that feeds the water to be treated in the reaction tank 77 to a subsequent stage, and an ultrafiltration membrane device 74 that filters the water to be treated, which is doped with high basicity PAC, by the ultrafiltration membrane. A transfer pipe 75 and a concentrated water pipe 76 are connected to the ultrafiltration membrane device 74, respectively transferring permeated water thereof and discharging concentrated water thereof. The test device 7 further includes an air compressor (not illustrated) that feeds air into the ultrafiltration membrane device during air cleaning.

Experimental Example 1

The raw water of Example 1 was accommodated in the reaction tank 77 as the water to be treated, and high basicity PAC was added to the water to be treated at a concentration of 20 mg/L in terms of $Al_2O_3$ concentration. Subsequently, the water to be treated in the reaction tank 77 was passed through and filtered by the ultrafiltration membrane 74 at a water recovery rate of 90%. Subsequently, the flow of water was stopped, the ultrafiltration membrane was backwashed, and the process was resumed after the backwashing. This process was repeated for several sets and permeated water was collected. The backwashing was carried out by combining air backwashing and air bubbling in the module. Note that, as the ultrafiltration membrane device, an external-pressure-type ultrafiltration device equipped with a single hollow fiber test prototype module and an ultrafiltration (UF) membrane made of polyvinylidene fluoride (PDVF) having a membrane area of 10 cm$^2$ and a nominal pore diameter of 0.02 μm was used, and the supply pressure of raw water to the ultrafiltration membrane device was 0.06 MPa.

Experimental Example 2 and Experimental Example 3

Testing was carried out as in Experimental Example 1 except that the first concentrated water and the second concentrated water in Example 1 were used as the water to be treated in Experimental Example 2 and Experimental Example 3, respectively, and high basicity PAC was added thereto. That is, after the addition of PAC, water was passed through and filtered by the ultrafiltration membrane. Subsequently, as in Experimental Example 1, the flow of water was stopped, the ultrafiltration membrane was backwashed, and the process was resumed after the backwashing. This process was repeated for several sets and permeated water was collected.

Experimental Example 4 and Experimental Example 5

Other than not adding the high basicity PAC respectively added in Experimental Example 2 and Experimental Example 3, the first concentrated water and second concentrated water in Example 1, which was the water to be treated, were passed through and filtered by the ultrafiltration membrane, the flow of water was subsequently stopped, and the ultrafiltration membrane was backwashed, as in Experimental Example 2 and Experimental Example 3. The process was then resumed after backwashing. This process was repeated for several sets.

The results of measuring the TOC concentration in the collected permeated water are shown in Table 2. In Experimental Example 1, Experimental Example 4, and Experimental Example 5, substantially no TOC was removed, but in Experimental Example 2 and Experimental Example 3, the TOC removal rates were approximately 68% and 73%, respectively.

TABLE 2

| | TOC concentration of water to be treated (mg/L) | TOC concentration of UF membrane permeated water (mg/L) | TOC removal rate (%) |
|---|---|---|---|
| Experimental Example 1 | 2.0 | 1.7 | 15 |
| Experimental Example 2 | 4.7 | 1.5 | 68 |
| Experimental Example 3 | 8.3 | 2.2 | 73 |
| Experimental Example 4 | 4.7 | 4.3 | 9 |
| Experimental Example 5 | 8.3 | 7.8 | 6 |

From the Examples and Comparative Examples, it can be seen that, by adding PAC to the raw water and the second concentrated water and dead-end-filtering the second concentrated water doped with the PAC by the ultrafiltration membrane device, it is possible to achieve a water recovery rate by the ultrafiltration membrane devices in the three stages of 99.0% or higher while suppressing clogging of the ultrafiltration membrane devices in the three stages.

Further, the turbidity is slightly higher in Example 2 compared with that in Example 1. This is considered to be because, in the case of low basicity PAC, the floc was slightly broken during the transfer from the ultrafiltration membrane device in the first stage to the ultrafiltration membrane device in the second stage, decreasing the removal rate of turbidity and causing leakage of aluminum to the subsequent stage.

Further, according to the Experimental Examples, it can be seen that the total organic carbon (TOC) concentration in water can be reduced by adding high basicity PAC to the first concentrated water and the second concentrated water and filtering the first concentrated water and the second concentrated water by the ultrafiltration membrane device. Therefore, when the present invention is applied to a system for producing pure water or ultrapure water, it is possible to reduce the TOC removal load of a device provided in subsequent stages (such as an ultraviolet oxidation device and an ion exchange device in a subsequent stage).

REFERENCE SIGNS LIST 1 to 4 Production device for water for pure water, 5 Ultrapure water production system, 11, 41 Raw water supply device, 12, 22, 42, 52 Polyaluminum chloride supply device, 13 Raw water transfer pipe, 14, 24, 34, 44, 54, 64 Ultrafiltration membrane device, 17, 63 Reaction tank, 18 pH adjustment device, 50 Pretreatment system, 51 Primary pure water system (pure water production system), 52 Secondary pure water system (subsystem), 53 Point of use (POU), 513 Ultraviolet oxidation device (TOC-UV), 514 Ion exchange device, TK1, TK2 Tank, 521 Ultraviolet oxidation device (TOC-UV), 522 Non-regenerative polisher, 523 Membrane degasification device (MDG), 524 Ultrafiltration membrane device (UF)

The invention claimed is:

1. A production method for water for pure water, the production method comprising:

adding polyaluminum chloride to raw water to produce first treated water; and two or more filtering stages comprising: filtering the first treated water containing polyaluminum chloride with a filtration membrane device in a preceding stage, to produce first concentrated water; and filtering the first concentrated water with a filtration membrane device in a subsequent stage, to produce the water for pure water as permeated water from the filtering in the two or more filtering stages, wherein both of the filtration membrane device in the preceding stage and the filtration membrane device in the subsequent stage comprise at least one of an ultrafiltration membrane and a microfiltration membrane.

2. The production method according to claim 1, wherein adding polyaluminum chloride having a basicity greater than 75% to the raw water to produce the first treated water including microfloc.

3. The production method according to claim 1, wherein the polyaluminum chloride includes aluminum chloride pentahydroxide, and the aluminum chloride pentahydroxide is added in an amount of 0.25 mg/L or greater and 25 mg/L or less with respect to the raw water in terms of aluminum oxide ($Al_2O_3$) concentration.

4. The production method according to claim 1, further comprising:

adjusting a pH of the raw water doped with the polyaluminum chloride, wherein the polyaluminum chloride has a basicity of 75% or less.

5. The production method according to claim 1, further comprising:

at least one process of adding polyaluminum chloride to concentrated water produced by, among the filtration membrane devices in the two or more stages, at least the filtration membrane device in one stage, and then supplying the concentrated water to the filtration membrane device in the subsequent stage.

6. The production method according to claim 1, further comprising:

adding polyaluminum chloride to concentrated water produced by, among the filtration membrane devices in the two or more stages, at least the filtration membrane device in a final stage to produce second treated water; and dead-end filtering the second treated water by the filtration membrane device, wherein the filtration membrane device in a final stage comprises at least one of an ultrafiltration membrane and a microfiltration membrane and, permeated water produced by the dead-end filtering is used as the raw water.

7. The production method according to claim 6, further comprising:

cleaning the filtration membrane device that performed the dead-end filtering; and separating a supernatant from wash water generated in the cleaning, wherein the supernatant is used as the raw water.

8. A production method for pure water, the production method comprising, in order:

producing water for pure water by adding polyaluminum chloride to raw water to produce first treated water, and two or more filtering stages comprising: filtering the first treated water containing polyaluminum chloride with a filtration membrane device in a preceding stage, to produce first concentrated water; and filtering the first concentrated water with a filtration membrane device in a subsequent stage, to produce the water for pure water as permeated water produced by the filtering in the two or more filtering stages, wherein both of the filtration membrane device in the preceding stage and the filtration membrane device in the subsequent stage comprise at least one of an ultrafiltration membrane and a microfiltration membrane; and performing ultraviolet oxidation and performing ion exchange.

* * * * *